US012641254B1

(12) United States Patent
Belur Ramachandra et al.

(10) Patent No.: US 12,641,254 B1
(45) Date of Patent: May 26, 2026

(54) ADAPTIVE RESOURCE CONTROL FOR VIDEO STREAMING

(71) Applicant: QUALCOMM Incorporated, San Diego, CA (US)

(72) Inventors: Vinod Belur Ramachandra, Chennai (IN); Arunkumar Nagarajan, Chennai (IN); Vinay Melkote Krishnaprasad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/022,595

(22) Filed: Jan. 15, 2025

(51) Int. Cl.
*H04N 19/146* (2014.01)
*G06F 3/01* (2006.01)
*H04N 19/172* (2014.01)

(52) U.S. Cl.
CPC ........... *H04N 19/172* (2014.11); *G06F 3/013* (2013.01); *H04N 19/146* (2014.11)

(58) Field of Classification Search
None
See application file for complete search history.

(56) References Cited

U.S. PATENT DOCUMENTS

| | | | | |
|---|---|---|---|---|
| 2018/0131613 | A1* | 5/2018 | Fraser | H04L 47/25 |
| 2018/0167431 | A1* | 6/2018 | Kim | H04L 43/0864 |
| 2025/0141768 | A1* | 5/2025 | Ajaykumar | H04L 47/25 |
| 2025/0168257 | A1* | 5/2025 | Stalling | H04L 47/127 |

FOREIGN PATENT DOCUMENTS

WO    WO-2024209097 A1 *  10/2024   ........... H04L 67/131

* cited by examiner

*Primary Examiner* — Tyler W. Sullivan
(74) *Attorney, Agent, or Firm* — Holland & Hart LLP

(57) ABSTRACT

Methods, systems, and devices for adaptive rate control for video streaming are described. A network entity may obtain position of view data associated with a video bitstream from a first wireless device and may output, to a second wireless device, a first video frame of the bitstream that is generated based on the position of view data. A first timestamp may be associated with output of the first video frame. The network entity may receive, from the second wireless device, an acknowledgement message associated with receipt of the first video frame. A second timestamp may be associated with receipt of the acknowledgement message. The network entity may output, to the second wireless device, a second video frame that is encoded using a bitrate that is different from a bitrate used to encode the first video frame and that is based on the first timestamp and the second timestamp.

20 Claims, 17 Drawing Sheets

130

105

115

Network Entity

Transceiver

1010

Antenna

1015

Communications Manager

1020

Memory

Code

1030

1025

1040

Processor

1035

1005

1000

1110

1120

1115

1105

1100

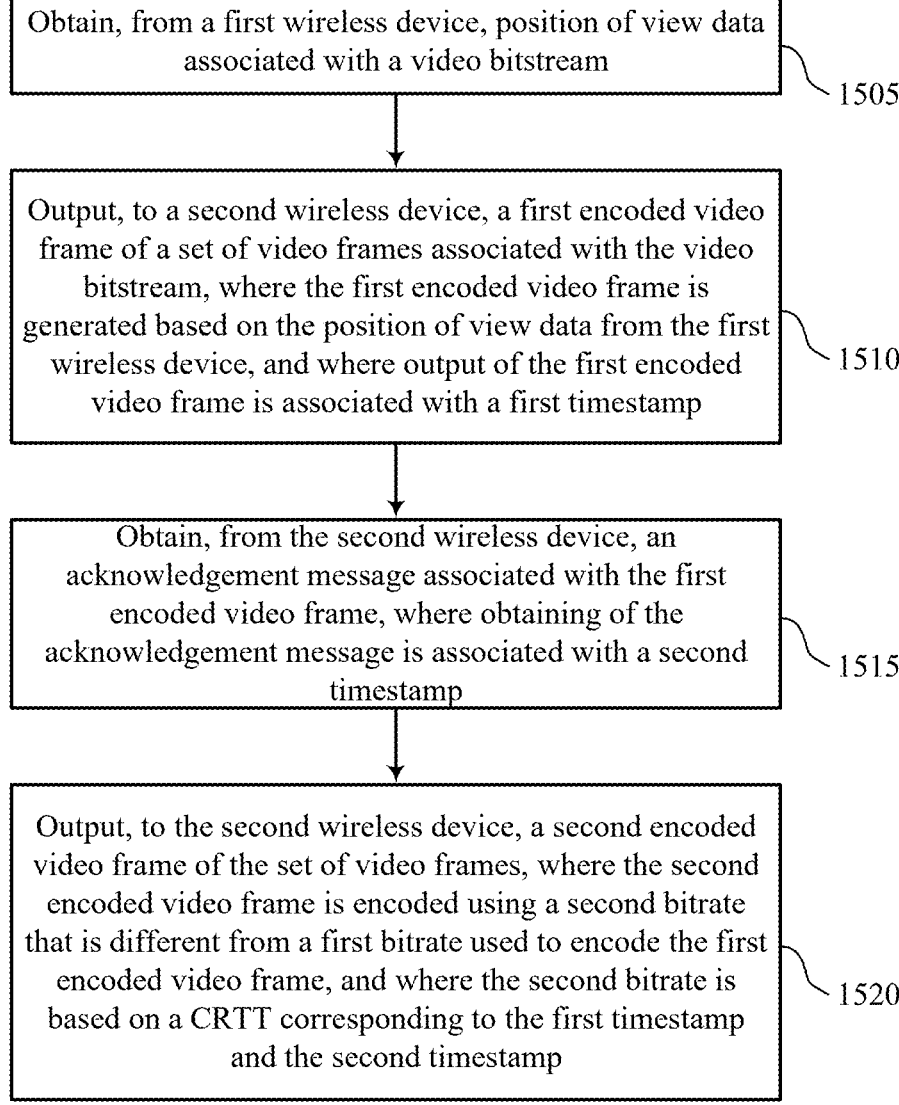

Obtain, from a first wireless device, position of view data associated with a video bitstream

~ 1505

Output, to a second wireless device, a first encoded video frame of a set of video frames associated with the video bitstream, where the first encoded video frame is generated based on the position of view data from the first wireless device, and where output of the first encoded video frame is associated with a first timestamp

~ 1510

Obtain, from the second wireless device, an acknowledgement message associated with the first encoded video frame, where obtaining of the acknowledgement message is associated with a second timestamp

~ 1515

Output, to the second wireless device, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp

Obtain, from a second wireless device, position of view data associated with a video bitstream

~1605

Send, to a network entity, the position of view data

~1610

~1600

ADAPTIVE RESOURCE CONTROL FOR VIDEO STREAMING

FIELD OF TECHNOLOGY

The following relates to wireless communications, including adaptive rate control for video streaming.

BACKGROUND

Wireless communications systems are widely deployed to provide various types of communication content such as voice, video, packet data, messaging, broadcast, and so on. Wireless communication systems may include various types of wireless communication devices including network entities (such as wireless access points (APs) or base stations (BSs)), client devices (such as wireless stations (STAs) or user equipment (UEs)), and other wireless nodes. These wireless communication devices may communicate with one another via a variety of technologies and wireless communication protocols, including cellular-based protocols (such as fourth generation (4G) systems such as Long Term Evolution (LTE) systems, LTE-Advanced (LTE-A) systems, or LTE-A Pro systems, and fifth generation (5G) systems, which may be referred to as New Radio (NR) systems) or wireless local area network (WLAN) or Wi-Fi-based protocols (such as a WLAN formed by APs that provide a shared wireless communication medium for use by one or more STAs). In some examples, these systems may be capable of supporting communication with multiple users by sharing available system resources (e.g., time, frequency, and power). These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, such as UEs.

Some wireless communications systems may be capable of processing, storage, generation, manipulation and rendition of multimedia information and may, in some cases, be referred to as multimedia systems. Examples of multimedia systems include entertainment systems, information systems, extended reality (XR) systems (e.g., virtual reality (VR) systems, augmented reality (AR) systems, or mixed reality (MR) systems), model and simulation systems, and so on. These systems may employ a combination of hardware and software technologies to support processing, storage, generation, manipulation, and rendition of multimedia information, such as capture devices, storage devices, communication networks, computer systems, and display devices.

SUMMARY

The systems, methods, and devices of this disclosure each have several innovative aspects, no single one of which is solely responsible for the desirable attributes disclosed herein.

A method for wireless communications by a network entity is described. The method may include obtaining, from a first wireless device, position of view data associated with a video bitstream, outputting, to a second wireless device, a first encoded video frame of a set of video frames associated with the video bitstream, where the first encoded video frame is generated based on the position of view data from the first wireless device, and where output of the first encoded video frame is associated with a first timestamp, obtaining, from the second wireless device, an acknowledgement message associated with the first encoded video frame, where obtaining of the acknowledgement message is associated with a second timestamp, and outputting, to the second wireless device, a second encoded video frame of the set of video frames, where the second encoded video frame is encoded using a second bitrate that is different from a first bitrate used to encode the first encoded video frame, and where the second bitrate is based on a client round trip time (RTT) corresponding to the first timestamp and the second timestamp.

A network entity for wireless communications is described. The network entity may include one or more memories storing processor executable code, and one or more processors coupled with the one or more memories. The one or more processors may individually or collectively be operable to execute the code to cause the network entity to obtain, from a first wireless device, position of view data associated with a video bitstream, output, to a second wireless device, a first encoded video frame of a set of video frames associated with the video bitstream, where the first encoded video frame is generated based on the position of view data from the first wireless device, and where output of the first encoded video frame is associated with a first timestamp, obtain, from the second wireless device, an acknowledgement message associated with the first encoded video frame, where obtaining of the acknowledgement message is associated with a second timestamp, and output, to the second wireless device, a second encoded video frame of the set of video frames, where the second encoded video frame is encoded using a second bitrate that is different from a first bitrate used to encode the first encoded video frame, and where the second bitrate is based on a client RTT corresponding to the first timestamp and the second timestamp.

Another network entity for wireless communications is described. The network entity may include means for obtaining, from a first wireless device, position of view data associated with a video bitstream, means for outputting, to a second wireless device, a first encoded video frame of a set of video frames associated with the video bitstream, where the first encoded video frame is generated based on the position of view data from the first wireless device, and where output of the first encoded video frame is associated with a first timestamp, means for obtaining, from the second wireless device, an acknowledgement message associated with the first encoded video frame, where obtaining of the acknowledgement message is associated with a second timestamp, and means for outputting, to the second wireless device, a second encoded video frame of the set of video frames, where the second encoded video frame is encoded using a second bitrate that is different from a first bitrate used to encode the first encoded video frame, and where the second bitrate is based on a client RTT corresponding to the first timestamp and the second timestamp.

A non-transitory computer-readable medium storing code for wireless communications is described. The code may include instructions executable by one or more processors to obtain, from a first wireless device, position of view data associated with a video bitstream, output, to a second wireless device, a first encoded video frame of a set of video frames associated with the video bitstream, where the first encoded video frame is generated based on the position of view data from the first wireless device, and where output of the first encoded video frame is associated with a first timestamp, obtain, from the second wireless device, an acknowledgement message associated with the first encoded video frame, where obtaining of the acknowledgement message is associated with a second timestamp, and output, to the second wireless device, a second encoded video frame of the set of video frames, where the second encoded video frame is encoded using a second bitrate that is different from a first bitrate used to encode the first encoded video frame, and where the second bitrate is based on a client RTT corresponding to the first timestamp and the second timestamp.

Some examples of the method, network entities, and non-transitory computer-readable medium described herein may further include operations, features, means, or instructions for measuring, based on the client RTT and a network processing time associated with processing the first encoded video frame, a network RTT (NRTT).

In some examples of the method, network entities, and non-transitory computer-readable medium described herein, the network processing time includes a sum of a pose wait time, a rendering time, and an encoding time.

In some examples of the method, network entities, and non-transitory computer-readable medium described herein, adjusting, based on the NRTT, an encoding bitrate associated with encoding the video bitstream from the first bitrate to the second bitrate.

In some examples of the method, network entities, and non-transitory computer-readable medium described herein, the first wireless device may be a controller device configured to generate the position of view data and the second wireless device may be a HMD configured to output the video bitstream.

In some examples of the method, network entities, and non-transitory computer-readable medium described herein, the controller device may be a joystick, a mobile phone, or a FPV drone.

In some examples of the method, network entities, and non-transitory computer-readable medium described herein, the position of view data includes head pose data, eye gaze data, or a combination thereof.

A method for wireless communications by a first wireless device is described. The method may include obtaining, from a second wireless device, position of view data associated with a video bitstream and sending, to a network entity, the position of view data.

A first wireless device for wireless communications is described. The first wireless device may include one or more memories storing processor executable code, and one or more processors coupled with the one or more memories. The one or more processors may individually or collectively be operable to execute the code to cause the first wireless device to obtain, from a second wireless device, position of view data associated with a video bitstream and send, to a network entity, the position of view data.

Another first wireless device for wireless communications is described. The first wireless device may include means for obtaining, from a second wireless device, position of view data associated with a video bitstream and means for sending, to a network entity, the position of view data.

A non-transitory computer-readable medium storing code for wireless communications is described. The code may include instructions executable by one or more processors to obtain, from a second wireless device, position of view data associated with a video bitstream and send, to a network entity, the position of view data.

A method for wireless communications by a second wireless device is described. The method may include receiving, from a network entity, a first encoded video frame of a set of video frames associated with a video bitstream, where the first encoded video frame based on position of view data from a first wireless device, and where receipt of the first encoded video frame is associated with a first timestamp, decoding the first encoded video frame, outputting, via a display device, the decoded first encoded video frame, sending, to the network entity, an acknowledgement message associated with the first encoded video frame, where obtaining of the acknowledgement message is associated with a second timestamp, receiving, from the network entity, a second encoded video frame of the set of video frames, where the second encoded video frame is encoded using a second bitrate that is different from a first bitrate used to encode the first encoded video frame, and where the second bitrate is based on a client RTT corresponding to the first timestamp and the second timestamp, decoding the second encoded video frame, and outputting, via the display device, the decoded second encoded video frame.

A second wireless device for wireless communications is described. The second wireless device may include one or more memories storing processor executable code, and one or more processors coupled with the one or more memories. The one or more processors may individually or collectively be operable to execute the code to cause the second wireless device to receive, from a network entity, a first encoded video frame of a set of video frames associated with a video bitstream, where the first encoded video frame based on position of view data from a first wireless device, and where receipt of the first encoded video frame is associated with a first timestamp, decode the first encoded video frame, output, via a display device, the decoded first encoded video frame, send, to the network entity, an acknowledgement message associated with the first encoded video frame, where obtaining of the acknowledgement message is associated with a second timestamp, receive, from the network entity, a second encoded video frame of the set of video frames, where the second encoded video frame is encoded using a second bitrate that is different from a first bitrate used to encode the first encoded video frame, and where the second bitrate is based on a client RTT corresponding to the first timestamp and the second timestamp, decode the second encoded video frame, and output, via the display device, the decoded second encoded video frame.

Another second wireless device for wireless communications is described. The second wireless device may include means for receiving, from a network entity, a first encoded video frame of a set of video frames associated with a video bitstream, where the first encoded video frame based on position of view data from a first wireless device, and where receipt of the first encoded video frame is associated with a first timestamp, means for decoding the first encoded video frame, means for outputting, via a display device, the decoded first encoded video frame, means for sending, to the network entity, an acknowledgement message associated with the first encoded video frame, where obtaining of the acknowledgement message is associated with a second timestamp, means for receiving, from the network entity, a second encoded video frame of the set of video frames, where the second encoded video frame is encoded using a second bitrate that is different from a first bitrate used to encode the first encoded video frame, and where the second bitrate is based on a client RTT corresponding to the first timestamp and the second timestamp, means for decoding the second encoded video frame, and means for outputting, via the display device, the decoded second encoded video frame.

A non-transitory computer-readable medium storing code for wireless communications is described. The code may include instructions executable by one or more processors to receive, from a network entity, a first encoded video frame of a set of video frames associated with a video bitstream, where the first encoded video frame based on position of view data from a first wireless device, and where receipt of the first encoded video frame is associated with a first timestamp, decode the first encoded video frame, output, via a display device, the decoded first encoded video frame, send, to the network entity, an acknowledgement message associated with the first encoded video frame, where obtaining of the acknowledgement message is associated with a second timestamp, receive, from the network entity, a second encoded video frame of the set of video frames, where the second encoded video frame is encoded using a second bitrate that is different from a first bitrate used to encode the first encoded video frame, and where the second bitrate is based on a client RTT corresponding to the first timestamp and the second timestamp, decode the second encoded video frame, and output, via the display device, the decoded second encoded video frame.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

6

Figure 10:

FIG. 10 shows a diagram of a system including a device that supports adaptive rate control for video streaming in accordance with one or more aspects of the present disclosure.

Figure 11:
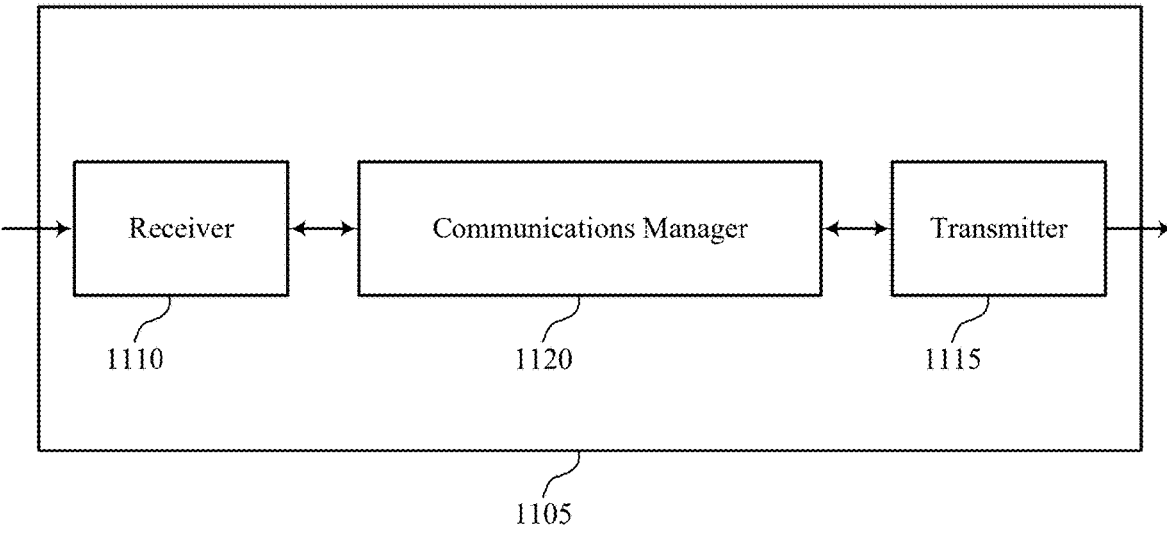
Figure 12:
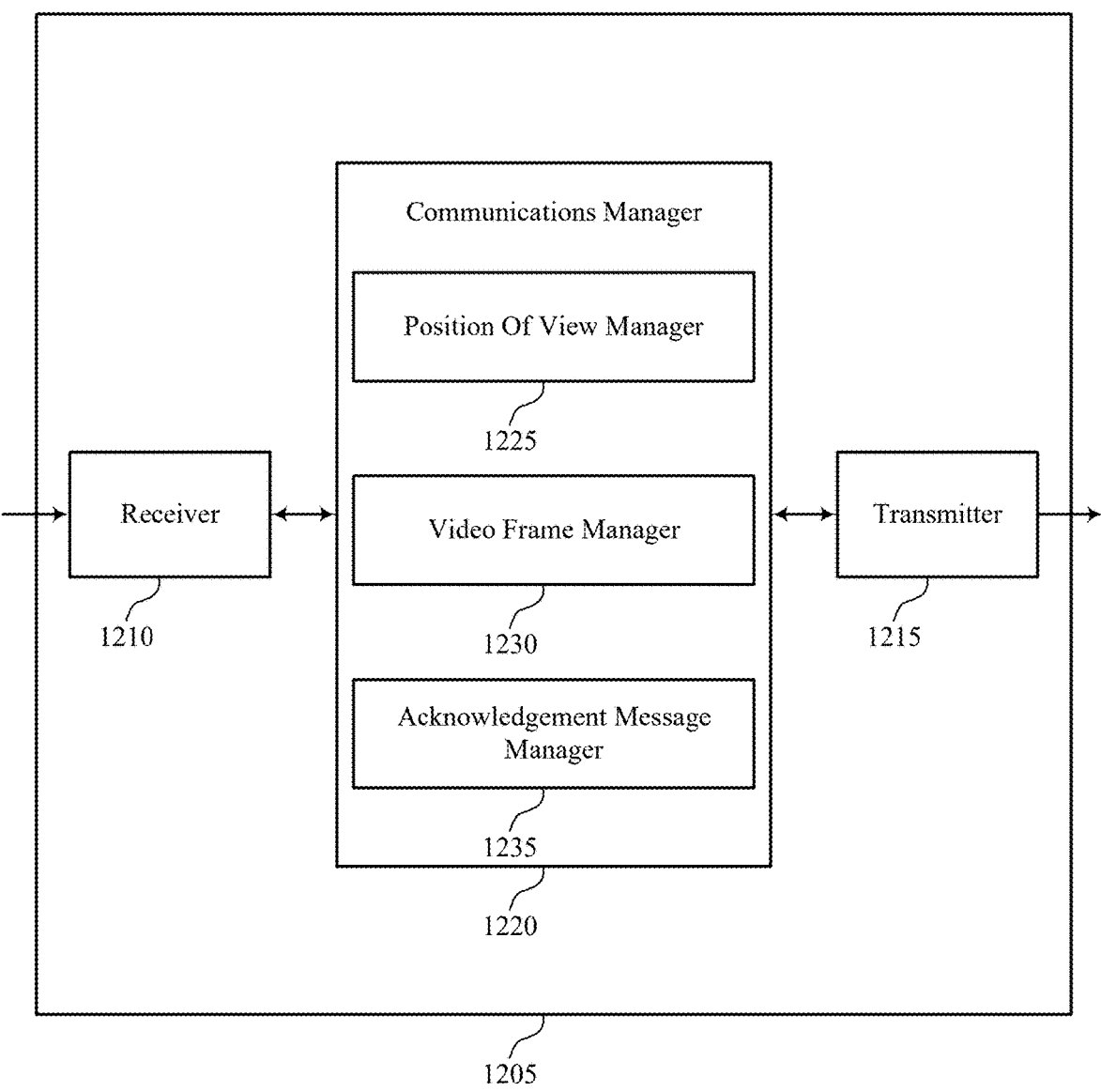

FIGS. 11 and 12 show block diagrams of devices that support adaptive rate control for video streaming in accordance with one or more aspects of the present disclosure.

Figure 13:
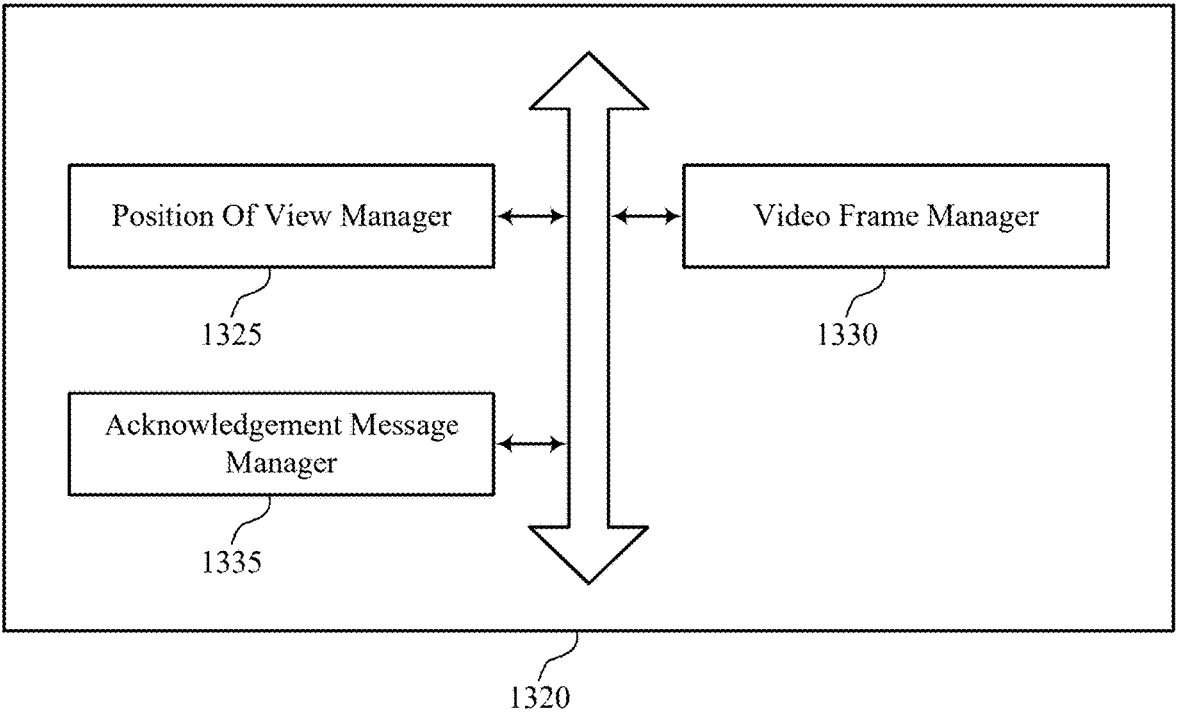

FIG. 13 shows a block diagram of a communications manager that supports adaptive rate control for video streaming in accordance with one or more aspects of the present disclosure.

Figure 14:
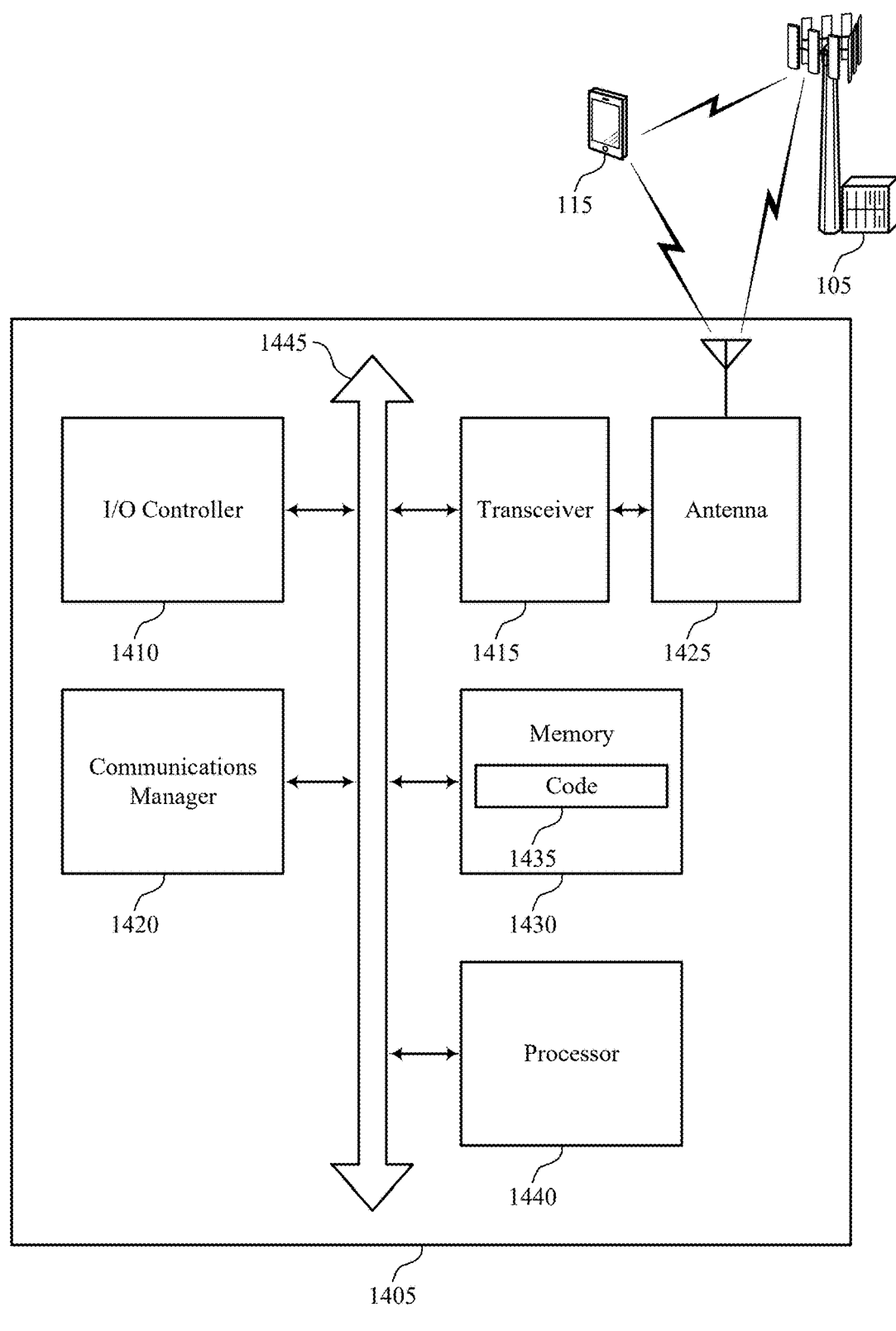

FIG. 14 shows a diagram of a system including a device that supports adaptive rate control for video streaming in accordance with one or more aspects of the present disclosure.

Figure 16:
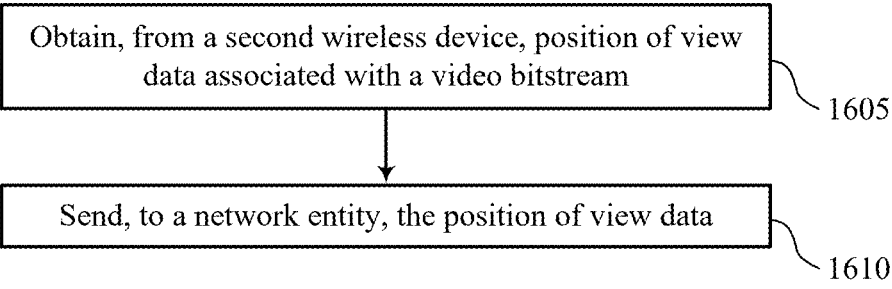
Figure 17:
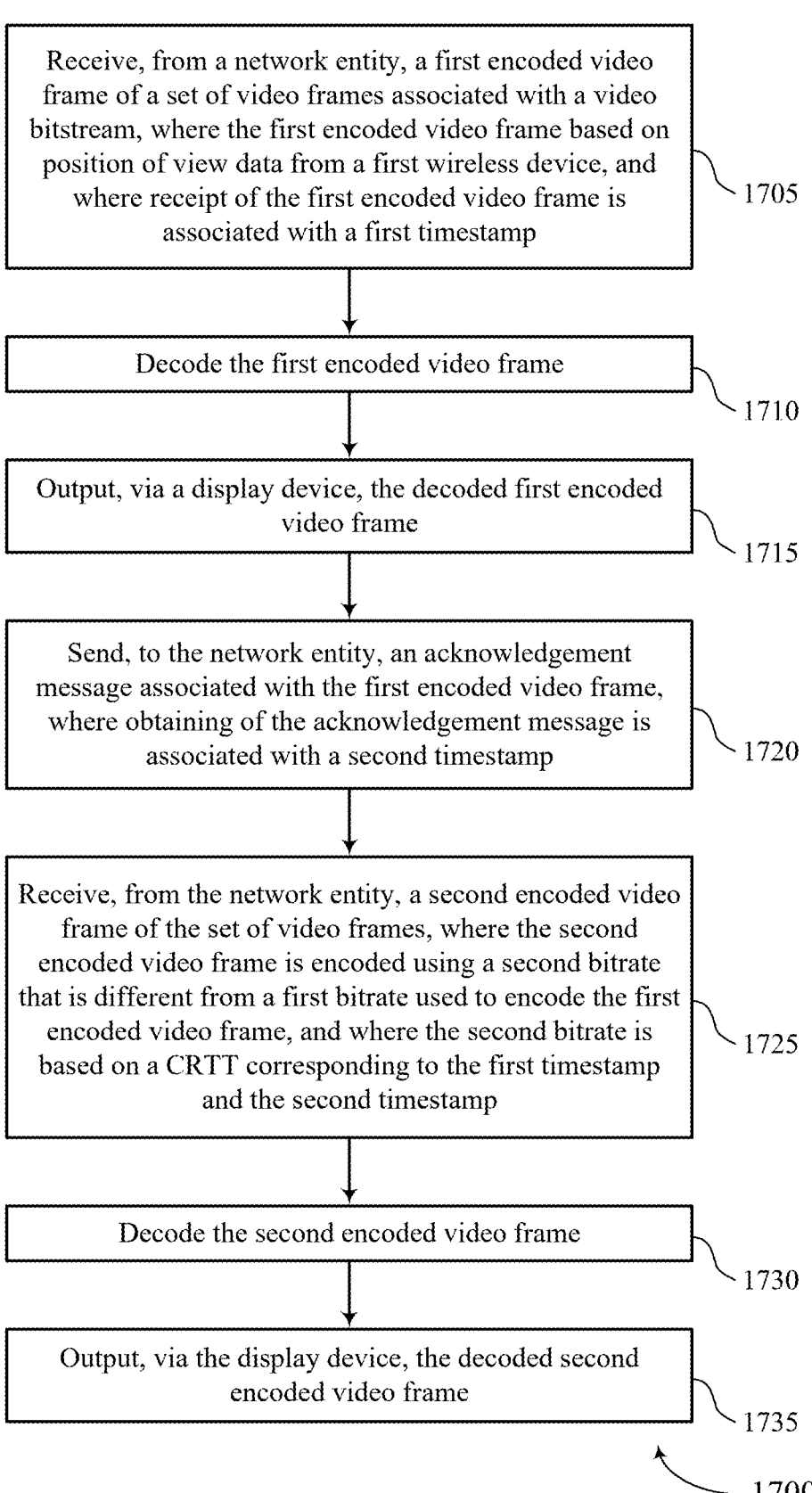

FIGS. 15 through 17 show flowcharts illustrating methods that support adaptive rate control for video streaming in accordance with one or more aspects of the present disclosure.

DETAILED DESCRIPTION

Wireless communication systems may provide or support the communication of various types of multimedia data, such as voice, video, images, messaging, etc., over a wireless network. One example of such a wireless communications systems, in some cases referred to as a multimedia system, is an extended reality (XR) system, which may include a virtual reality (VR) system, an augmented reality (AR) system, a mixed reality (MR) system, or any combination thereof. XR systems may provide interactive and immersive user experiences by merging the physical, digital, and virtual worlds into one. Some applications of such systems include education, gaming, healthcare, entertainment, tourism, Internet of Things (IOT)/drone video streaming, among others.

Some XR systems may utilize a split-rendering architecture in which complex rendering may be shifted from the client device (such as from a head-mounted display (HMD) device) to the network (such as to a server or a network entity device), and less complex rendering may be performed at the client device. This may enable reduced processing at the client device, which in turn may allow for lower complexity and lower cost hardware to be implemented at the client device. In such split XR systems, the client device may be a low-cost HMD that transmits position of view data (e.g., head pose data, orientation data, spatial positioning data, eye gaze data, etc.) to the network, such as to a server at the network. The server may perform that task of processing the received position of view data and rendering (e.g., updating or synchronizing with data from other devices, etc.) the XR content based on the received position of view data.

The server may encode (e.g., compress) a video frame of a video bitstream associated with the rendered XR content and transmit the encoded video frame, along with the rendered position of view data, back to the client device. The client device may decode (e.g., decompress) the received video frame, warp the decoded video frame using the rendered position of view data and the latest position of view data (e.g., position of view data generated since the video frame was transmitted from the server to the client device), and render the decoded video frame for display at the client device. In such systems, the client device may measure a client round trip latency (e.g., client round trip time (CRTT)), which may be a total time from when the position of view data is generated at the client device until a time at which a rendered video frame based on the position of view data (e.g., an updated or synchronized video frame) is received at the client device. For instance, the client device utilize a first timestamp to mark a starting point in the CRTT, such as when the position of view data is generated (or in some cases, when the position of view data is transmitted to the server), and a second timestamp to mark an end point in the CRTT, such as when the rendered video frame is received at the client device. The client device may subtract the first timestamp from the second timestamp to obtain the CRTT.

The CRTT may then be sent to the server and the server may determine (e.g., calculate, measure, etc.) a network round trip time (NRTT) by subtracting a server processing time (e.g., that includes a pose wait time before the updated pose is detected, a rendering time, a render time, an encoding time, or any combination thereof). The CRTT and the NRTT may have a direct impact on the user experience. For instance, a significant latency at either the client device, the server, or both may result in a noticeable delay between when a user's position changes (e.g., a change in eye gaze, orientation, etc.) and when that change is applied and visible in the XR content, which may be disruptive to the user experience. Accordingly, in some cases, the server may utilize the NRTT to determine whether to adjust or adapt the bitrate used the encode the video bitstream associated with the XR content. For instance, the server may implement an adaptive rate control algorithm that may be used to determine whether to reduce, increase, or maintain the encoding bitrate based on whether the NRTT (or a mean or standard deviation of the NRTT over one or more windows of time) satisfies one or more thresholds.

In some conventional implementations however, the server might not be able to implement this adaptive rate control algorithm to determine whether to adjust or adapt the encoding bitrate. This may occur when a source of the position of view data is different from the sink of the XR content. That is, when the device that transmits the position of view data to the server is different from the device which ultimately consumes the XR content (e.g., the client device). That is because in such cases, no single device is able to mark the starting and end points for the CRTT (e.g., mark the first and second timestamps indicating when the position of view data is generated or transmitted and when the rendered video frame is received).

For instance, in some implementations of the split XR architecture, the position of view of the client device may be controlled by a device other than the client device (e.g., other than the HMD). For example, a second device, such as controller device (e.g., a joystick, a user equipment (UE), a phone, a floor-mounted controller, a hand-held controller, etc.) may be used for such control. For instance, this may apply to a use case in which the client device (e.g., the HMD) acts only as a viewing device. For example, content associated with a gaming console may be viewed at an HMD and may be controlled with a joystick, UE, phone, or other controller. In another example, a first person view (FPV) drone may capture content that is streamed to an HMD and a viewing direction of a camera of the drone may be controlled by a hand-held controller (e.g., a joystick, UE, phone, or other controller). In these examples, the gaming console or the drone may operate as the server. In some examples, the server may be a UE, a phone, or other device.

In such systems, the controller device may generate the position of view data that is associated with the client device (or in some cases obtain the position of view data from the client device) and send the position of view data to the server on behalf of the client device. The server may subsequently process the position of view data, render the XR content based on the position of view data, encode a video frame associated with the rendered XR content, and transmit the encoded video frame, along with the rendered position of view data, back to the client device. In these cases, in such conventional systems, the CRTT may be measured from a time in which the position of view data is obtained at the controller device (or transmitted from the controller device to the server) until a time in which the encoded video frame with the rendered position of view data is received at the client device. In this case, because the starting point of the CRTT may be known by the controller device and the end point of the CRTT by the client device, a synchronized marking of first and second timestamps used by the adaptive rate control algorithm might not be possible. As a result, in conventional implementations, the adaptive rate control algorithm might not be available for implementation on lower complexity client devices that rely on separate devices for generating or communicating the position of view data on behalf of the client devices.

In accordance with aspects described herein, a wireless communication system may implement techniques that enable the adaptive rate algorithm to be utilized by lower complexity client devices that rely on separate devices for position of view data generation or transmission.

Aspects of the disclosure are initially described in the context of wireless communications systems. Aspects of the disclosure are further illustrated by and described with reference to apparatus diagrams, system diagrams, and flow-charts that relate to adaptive rate control for video streaming.

Figure 1:
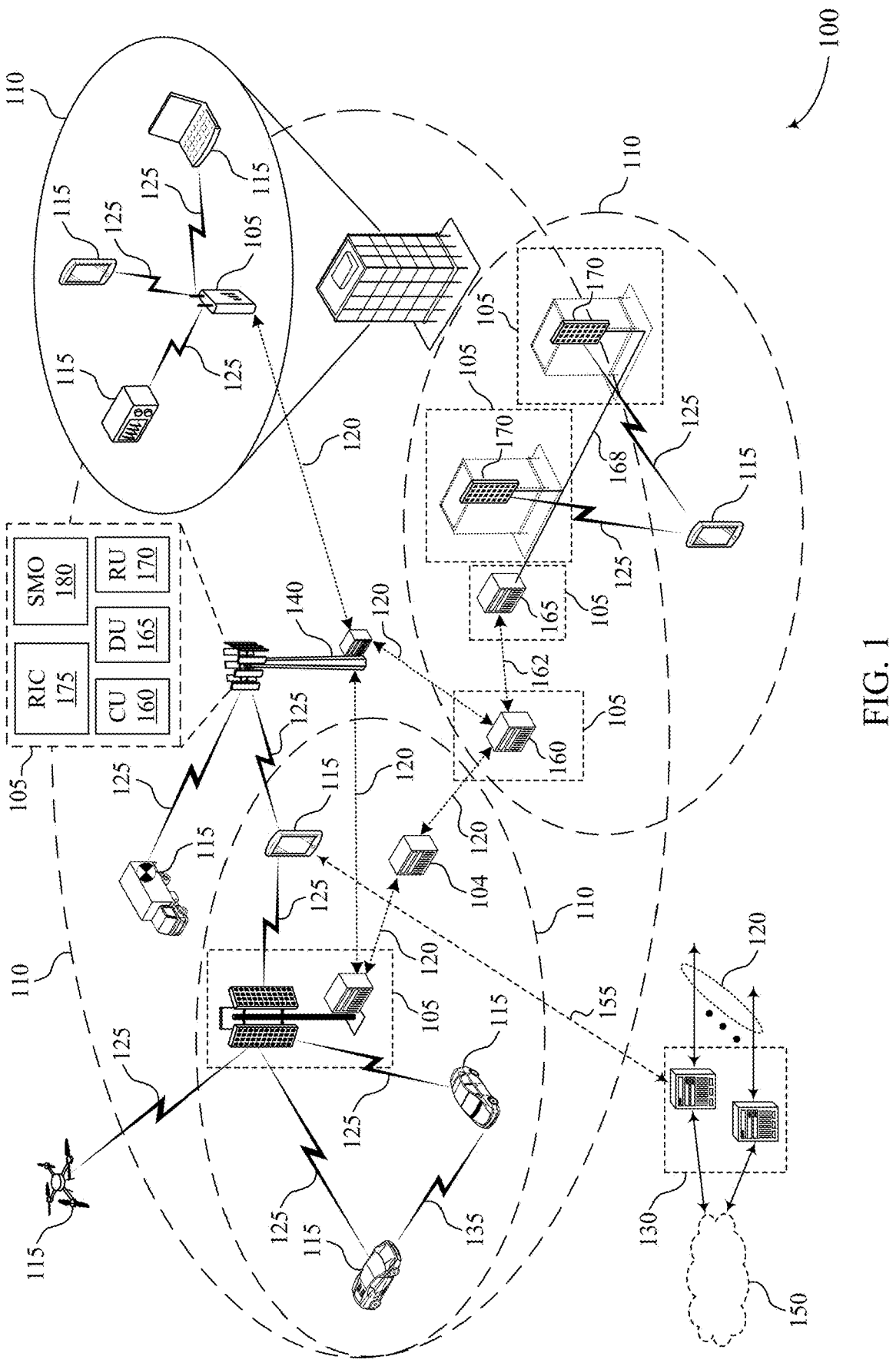
FIG. 1 shows an example of a wireless communications system that supports adaptive rate control for video streaming in accordance with one or more aspects of the present disclosure.

FIG. 1 shows an example of a wireless communications system 100 that supports adaptive rate control for video streaming in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support adaptive rate control for video streaming as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, a client device, a user device, an end user device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, a display device, a head-mounted display (HMD), a controller, a joystick, among other examples. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1. In some examples, the UEs 115 may support various types of communication and functional features related to multimedia (e.g., transmitting, receiving, broadcasting, streaming, sinking, capturing, storing, and recording multimedia data).

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In accordance with aspects described herein, an application or multimedia server, such as implemented at the core network 130, a network entity 105, or a UE 115, may serve as a source of multimedia content to be communicated to one or more wireless devices, such as to one or more first UEs 115. The one or more wireless devices may be used to view the streamed video and, in some examples, a second wireless device, such as a second UE 115, may be used to control or capture a position of view of a wireless device used to view the video. In some cases, to reduce latency associated with the rendering and transmission of the multimedia content and, thus, to improve a quality of a user experience at the wireless devices receiving the multimedia content, the server may adapt a bitrate used to encode the multimedia content based on latency as measured by the server. In implementations where separate devices are used as the source of the position of view data and the sink of the multimedia content, improved techniques for measuring such latency may be utilized.

Figure 2:
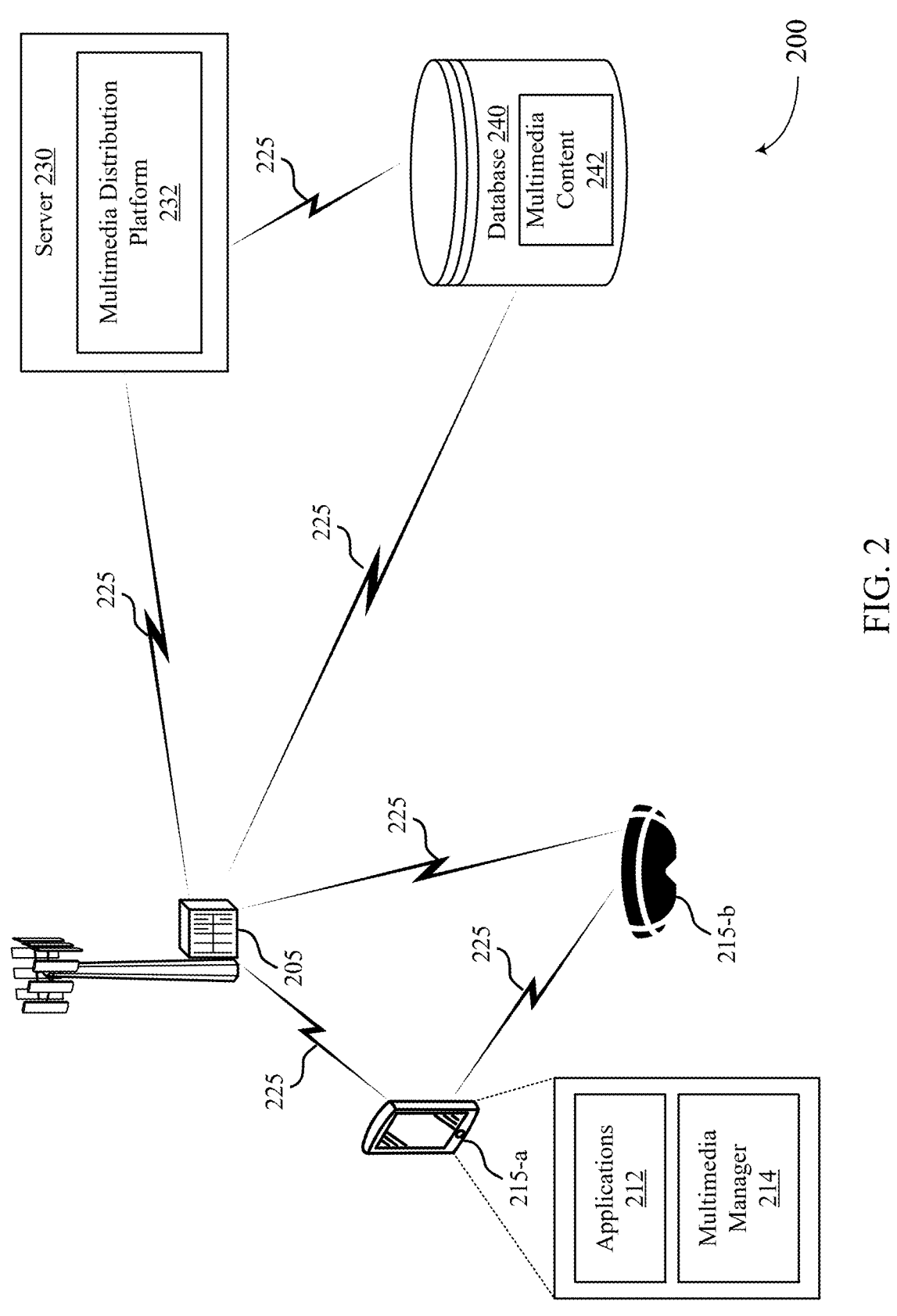
FIG. 2 shows an example of a portion of a wireless communications system that supports adaptive rate control for video streaming in accordance with one or more aspects of the present disclosure.

FIG. 2 shows an example of a portion of a wireless communications system 200 that supports adaptive rate control for video streaming in accordance with one or more aspects of the present disclosure. The wireless communications system 200 may implement or be implemented by aspects of the wireless communications system 100 described with reference to FIG. 1. For example, the wireless communications system 200 may include a network entity 205, a server 230, one or more wireless devices 215 (e.g., a first wireless device 215-a and a second wireless device 215-b), and a database 240. The network entity 205 may be an example of the network entity 105 described with reference to FIG. 1, and the first wireless device 215-a and the second wireless device 215-*b* may be examples of the UEs 115 described with reference to FIG. 1. The server 230 may be an example of a server implemented at the core network 130, a network entity 105, or a UE 115, as described with reference to FIG. 1. The network entity 205, the server 230, the first wireless device 215-*a*, the second wireless device 215-*b*, and the database 240 may communicate with each other and exchange information, via communications links 225, which may be examples of the communications links 125 described with reference to FIG. 1.

In some examples, one or more of the wireless devices 215 (e.g., the first wireless device 215-*a*) may include one or more applications 212, a multimedia manager 214, or a combination thereof. In some cases, one or more of the applications 212 may be a multimedia-based application that may receive (e.g., download, stream, broadcast) multimedia content 242 (e.g., image data, video data, audio data, etc.) from the server 230 (e.g., via the network entity 205) or from the database 240 (e.g., via the network entity 205 or the server 230). In some cases, the application 212 may transmit the multimedia content 242 to the server 230 or the database 240 (e.g., via the network entity 205) or to the another wireless device 215 (e.g., the second wireless device 215-*b*).

The multimedia manager 214 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, or the like. For example, the multimedia manager 214 may process multimedia content 242 from, or write multimedia content 242 to, a local memory of the wireless device 215 or to the database 240. The multimedia manager 214 may also be configured to provide multimedia enhancements, multimedia restoration, multimedia analysis, multimedia compression, multimedia streaming, and multimedia synthesis, among other functionalities. For example, the multimedia manager 214 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 214 may process multimedia content 242 to support adaptive rate control for video streaming, according to the techniques described herein.

The server 230 may be a data server, a cloud server, a server associated with an multimedia subscription provider, proxy server, web server, application server, communications server, home server, mobile server, or any combination thereof. The server 230 may, in some cases, include a multimedia distribution platform 232. The multimedia distribution platform 232 may allow the wireless devices 215 to discover, browse, share, and download multimedia content 242 via communications links 225 and, therefore, may provide a digital distribution of the multimedia content 242. As such, a digital distribution may be a form of delivering the multimedia content 242 without the use of physical media but over online delivery mediums, such as the Internet. For example, the wireless devices 215 may upload or download multimedia-related applications 212 for streaming, downloading, uploading, processing, enhancing, etc. the multimedia content 242. The server 230 may also transmit to the wireless devices 215 a variety of information, such as instructions or commands (e.g., multimedia-related information) to download multimedia-related applications 212 on the wireless devices 215. In some examples, the server 230 may be connected to or implemented at the core network to which the network entity 205 that servers the wireless devices 215 is connected. In some examples, the server 230 may be implemented at the network entity 205 or may itself be a network entity 205. In some examples, the server 230 may be implemented at one of the wireless devices 215 or may itself be a wireless device 215.

The database 240 may store a variety of information, such as instructions or commands (e.g., multimedia-related information), such as the multimedia content 242. The wireless devices 215 may retrieve the stored data from the database 240 via the communications links 225. In some examples, the database 240 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information). In some examples, the database 240 may be implemented at the server 230, the network entity 205, or one or more of the wireless devices 215.

In accordance with aspects described herein, the server 230, the network entity 205, or one of the wireless devices 215, may serve as a source of the multimedia content 242 to be communicated to one or more of the wireless devices 215. For example, the server 230 may maintain (or obtain, such as from the database 240) the multimedia content 242, e.g., XR content, that is streamed to one or more of the wireless devices 215 (e.g., directly or via a network entity 205 that serves the one or more wireless devices 215). In some examples, the server 230 may be implemented at a drone that streams video from a camera of the drone to the second wireless device 215-*b*. The second wireless device 215-*b* may be used to view the streamed video and, in some examples, may be a low cost, low complexity HMD used solely for viewing purposes. Because of the low complexity of the second wireless device 215-*b*, a separate standalone device, such as the first wireless device 215-*a* may be used to control or capture a position of view of the second wireless device 215-*b*. In some cases, the first wireless device 215-*a* may be a smart phone. In some cases, to reduce latency associated with the rendering and transmission of the multimedia content 242 and, thus, to improve a quality of a user experience at the wireless devices 215 receiving the multimedia content 242, the server 230 or the network entity 205 may adapt a bitrate used to encode the multimedia content 242 based on latency as measured by the server 230. In implementations where separate devices are used as the source of the position of view data and the sink of the multimedia content 242, improved techniques for measuring the latency may be utilized.

In one example, the first wireless device 215-*a* may send to the server 230 position of view data (e.g., head pose data, eye gaze data, orientation data, spatial positioning data, etc.) associated with the second wireless device 215-*b*, a video being streamed (e.g., a video bitstream) to the second wireless device 215-*b*, or a combination thereof. The first wireless device 215-*a* may mark a time at which the position of view data is sent to the server 230 with a first timestamp. The server 230 may output (e.g., transmit, send), to both the first wireless device 215-*a* and the second wireless device 215-*b*, an encoded first video frame (of the video bitstream)

that is generated (e.g., rendered) based the position of view data received from the first wireless device 215-*a*. The second wireless device 215-*b* may receive and render (e.g., output) the video frame, while the first wireless device 215-*a* may use the received video frame to determine a second timestamp marking a time at which the video frame is received and may, thereafter, discard the received video frame. Based on the first timestamp and the second timestamp, the first wireless device 215-*a* may calculate a CRTT associated with transmission of the position of view data and receipt of the encoded first video frame and may signal the CRTT to the server 230. Based on the CRTT and taking into account processing delays at the server 230, the server 230 may determine whether to adjust a bitrate associated with encoding the video bitstream.

In another example, the server 230 may obtain from the first wireless device 215-*a* position of view data associated with the second wireless device 215-*b*, a video being streamed to the second wireless device 215-*b*, or a combination thereof. The server 230 may output (e.g., transmit, send), to the second wireless device 215-*b*, an encoded first video frame (of the video bitstream) that is generated (e.g., rendered) based the position of view data received from the first wireless device 215-*a*. The server 230 may mark a time at which the encoded first video frame is output (e.g., transmitted, sent) with a first timestamp. The server 230 may obtain, from the second wireless device 215-*b*, a message acknowledging receipt of the encoded first video frame. The server 230 may to mark a time at which the acknowledgement message is received with a second timestamp. Based on the first timestamp and the second timestamp, the server 230 may calculate a CRTT associated with transmission of the position of view data from the first wireless device 215-*a* and receipt of the encoded first video frame by the second wireless device 215-*b*. In this example, the server 230 may calculate the CRTT without the assistance of either of the wireless devices 215. Based on the CRTT and taking into account processing delays at the server 230, the server 230 may determine whether to adjust a bitrate associated with encoding the video bitstream.

The techniques described herein may provide improvements by reducing round trip latency and, thereby, improving a quality of experience at one or more wireless devices 215. Furthermore, the techniques described herein may provide benefits and enhancements to the operation of the devices within a wireless communications system that implements a split XR architecture, such as by enabling low cost, low complexity wireless devices 215 to be utilized for less complex tasks (e.g., as viewing), while shifting more complex operations to one or more other devices within the wireless communications system.

Figure 3:
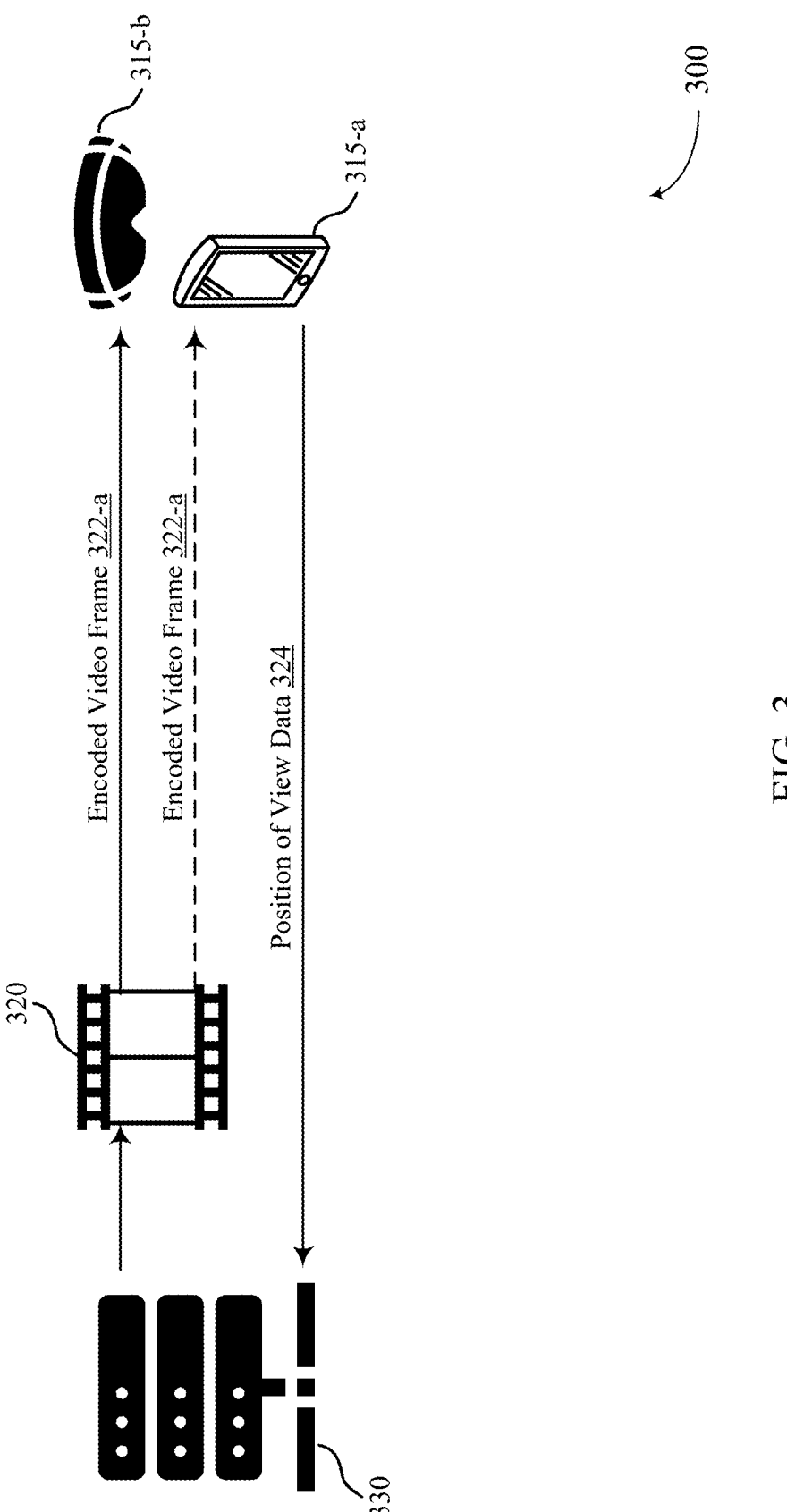
FIG. 3 shows an example of a first video transmission scheme that supports adaptive rate control for video streaming in accordance with one or more aspects of the present disclosure.

FIG. 3 shows an example of a first video transmission scheme 300 in a split XR architecture that supports adaptive rate control for video streaming in accordance with one or more aspects of the present disclosure. The first video transmission scheme 300 may implement or be implemented by aspects of the wireless communications systems 100 and 200 described with reference to FIGS. 1 and 2. For instance, the first video transmission scheme 300 may include a first wireless device 315-*a*, a second wireless device 315-*b*, and a server 330. The first wireless device 315-*a* and the second wireless device 315-*b* may be examples of the UEs 115 described with reference to FIG. 1 or may be examples of the first wireless device 215-*a* and the second wireless device 215-*b* described with reference to FIG. 2. The server 330 may be an example of a server implemented at the core network 130, a network entity 105, or a UE 115, as described with reference to FIG. 1 or may be an example of the server 230 described with reference to FIG. 2.

In this example, the server 330 (e.g., a smartphone, a drone, a media server, etc.) may stream a video bitstream 320 that may be viewed by the second wireless device 315-*b* (e.g., a HMD). The second wireless device 315-*b* may be a view-only device and the first wireless device 315-*a* may be used to capture and control a position of view associated with the second wireless device 315-*b* and the video bitstream 320 viewed thereon. In such cases, the first wireless device 315-*a* may send, to the server 330, position of view data 324 (e.g., head pose data, eye gaze data, orientation data, spatial positioning data, etc.) associated with the second wireless device 315-*b*, the video bitstream 320 being viewed thereon, or a combination thereof, and the server 330 may render a video frame (e.g., a first video frame 322-*a*) of the video bitstream 320 based on the received position of view data 324. The server 330 may encode the rendered first video frame 322-*a* and may send the encoded first video frame 322-*a* to both the first wireless device 315-*a* and the second wireless device 315-*b*. The encoded first video frame 322-*a* may be decoded by second wireless device 315-*b*, warped with any latest position of view data, and then output at a display of the second wireless device 315-*b* for viewing by a user.

Figure 4:
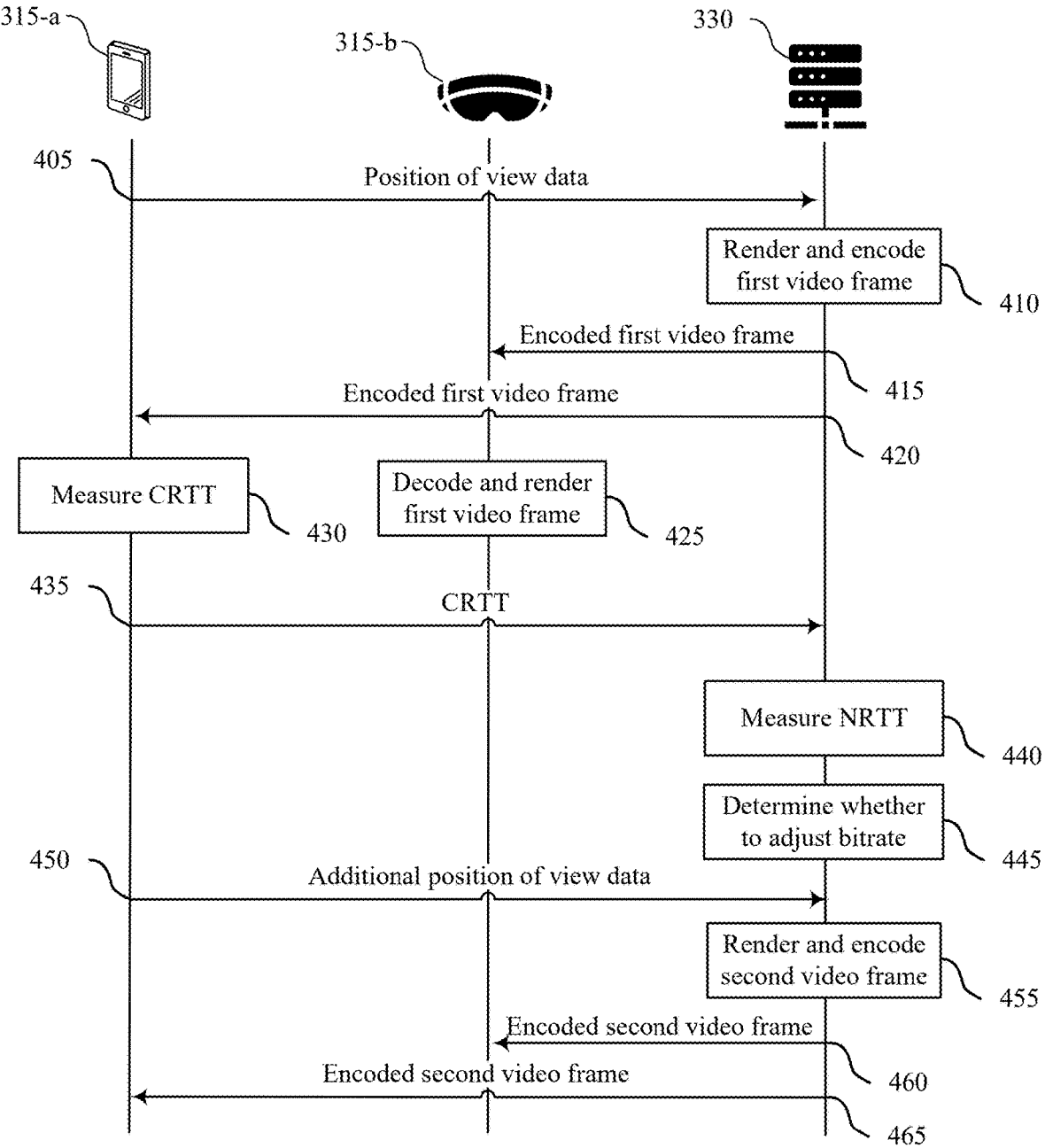
FIG. 4 shows an example of a signal flow that supports the first video transmission scheme for adaptive rate control for video streaming in accordance with one or more aspects of the present disclosure.

FIG. 4 shows an example of a signal flow 400 that supports the first video transmission scheme for adaptive rate control for video streaming in accordance with one or more aspects of the present disclosure. In some examples, signal flow 400 may implement aspects of or may be implemented by aspects of wireless communications systems 100 and 200 and the first video transmission scheme 300, described with reference to FIGS. 1 to 3. For instance, the signal flow 400 may be implemented by the server 330, the first wireless device 315-*a*, and the second wireless device 315-*b*, described with reference to FIG. 3. In the following description of the signal flow 400, the communications between the various entities may be performed in different orders or at different times. Some operations may also be omitted from the signal flow 400, and other operations may be added to the signal flow 400. In some examples, the operations illustrated in signal flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At step 405, the first wireless device 315-*a* may send (e.g., transmit, output, etc.), and the server 330 may receive, position of view data 324. For instance, the first wireless device 315-*a* may capture or obtain, from the second wireless device 315-*b*, position of view data 324 (e.g., head pose data, eye gaze data, orientation data, spatial positioning data, etc.) that is associated with the second wireless device 315-*b*, a video being streamed (e.g., the video bitstream 320) to the second wireless device 315-*b*, or a combination thereof. The first wireless device 315-*a* may send the position of view data 324 to the server 330. The first wireless device 315-*a* may mark a time at which the position of view data is sent to the server 330 using a first timestamp.

At step 410, the server 330 may render and encode a first video frame 322-*a*, associated with a set of video frames 322 of the video bitstream 320, based on the received position of view data 324. For instance, based on receiving the position of view data 324, the server 330 may obtain the first video frame 322-a (e.g., a next video frame of the set of video frames 322 to be consumed at the second wireless device 315-b) and may render (e.g., update, synchronize, etc.) the first video frame 322-a based on the received position of view data 324. The server 330 may encode the rendered first video frame to generate an encoded first video frame 322-a.

At steps 415 and 420, the server 330 may send (e.g., transmit, output, etc.) the encoded first video frame 322-a to both the first wireless device 315-a and the second wireless device 315-b. For instance, the server 330 may transmit a multicast transmission addressed to both the first wireless device 315-a and the second wireless device 315-b and including the encoded first video frame 322-a.

At step 425, the second wireless device 315-b may decode and render (e.g., output) the received first video frame 322-a. For instance, the second wireless device 315-b may decode the encoded first video frame 322-a and render the decoded first video frame 322-a by warping the decoded first video frame 322-a with the latest position of view data (e.g., position of view data generated since the encoded first video frame 322-a was transmitted from the server 330). The rendered first video frame 322-a may be output to a display of the second wireless device 315-b.

At step 430, which may occur before, after, or concurrent with step 425, the first wireless device 315-a may measure a CRTT associated with the transmission of the position of view data 324 and receipt of the encoded first video frame 322-a that is rendered based on the position of view data 324. For instance, the first wireless device 315-a may use the received encoded first video frame 322-a to determine (e.g., from an identity of the encoded frame packet) a second timestamp that marks a time at which the encoded first video frame 322-a is received. The first wireless device 315-a may, thereafter, discard the encoded first video frame 322-a. Based on the first timestamp and the second timestamp, the first wireless device 315-a may calculate a CRTT associated with transmission of position of view data 324 and receipt of the encoded first video frame 322-a.

At step 435, the first wireless device 315-a may send (e.g., transmit, output, etc.), and the server 330 may receive, the measured CRTT.

At step 440, the server 330 may measure an NRTT associated with the transmission of the position of view data 324 from the first wireless device 315-a and receipt of the encoded first video frame 322-a at the first wireless device 315. For instance, the server 330 may utilize the CRTT sent by the first wireless device 315-a to calculate the NRTT. The NRTT may take into account delays associated with processing and rendering the position of view data at the server 330, such as by subtracting, from the CRTT, the server processing time, which may include a pose wait time before the updated pose is detected, a rendering time, a render time, an encoding time, or any combination thereof.

At step 445, based on the NRTT, the server 330 may determine whether to adjust a bitrate associated with encoding the video bitstream 320 (e.g., whether to increase, reduce, or maintain a current encoding bitrate). For instance, the server 330 may utilize or implement an adaptive rate control algorithm to determine whether to reduce, increase, or maintain the encoding bitrate based on whether the NRTT (or a mean or standard deviation of the NRTT over one or more windows of time) satisfies one or more thresholds.

For example, the server 330 may determine the mean and standard deviation of the NRTT over a window of time. If the mean of the NRTT satisfies (e.g., is greater than) a first threshold or if the standard deviation of the NRTT satisfies (e.g., is greater than) a second threshold, then the server 330 may determine to reduce the bitrate associated with the video bitstream 320.

If the first threshold and second threshold are not satisfied, then the server 330 may determine whether the mean of the NRTT satisfies (e.g., is less than) a third threshold or if the standard deviation of the NRTT satisfies (e.g., is less than) a fourth threshold. If the third threshold or the fourth threshold are satisfied, then the server 330 may determine to increase the bitrate associated with the video bitstream 320.

If the third threshold and the fourth threshold are not satisfied, then the server 330 may determine to maintain the bitrate associated with the video bitstream 320 at the current bitrate.

The server 330 may then adjust or maintain the bitrate of the video bitstream 320 as determined.

At step 450, the first wireless device 315-a may send (e.g., transmit, output, etc.), and the server 330 may receive, additional position of view data 324. For instance, the additional position of view data 324 may be based on changes in a head pose, an eye gaze, an orientation, a spatial position, etc. at the second wireless device 315-b or associated with the video bitstream 320 streamed at the second wireless device 315-b.

At step 455, the server 330 may, thereafter, render and encode a second video frame 322-b of the video bitstream 320 based on the additional position of view data 324. In some cases, such as based on the determination of whether to adjust the bitrate of the video bitstream 320, the second video frame 322-b may be encoded using an adjusted bitrate. For instance, the bitrate used to encode the second video frame 322-b may be different from a bitrate used to encode the first video frame 322-a. In other cases, the bitrate used to encode the second video frame 322-b may not be adjusted and, instead, may be the same as the bitrate used to encode the first video frame 322-a.

At step 460 and 465, the server 330 may send (e.g., transmit, output, etc.), to the first wireless device 315-a and the second wireless device 315-b, the encoded second video frame 322-b.

Figure 5:
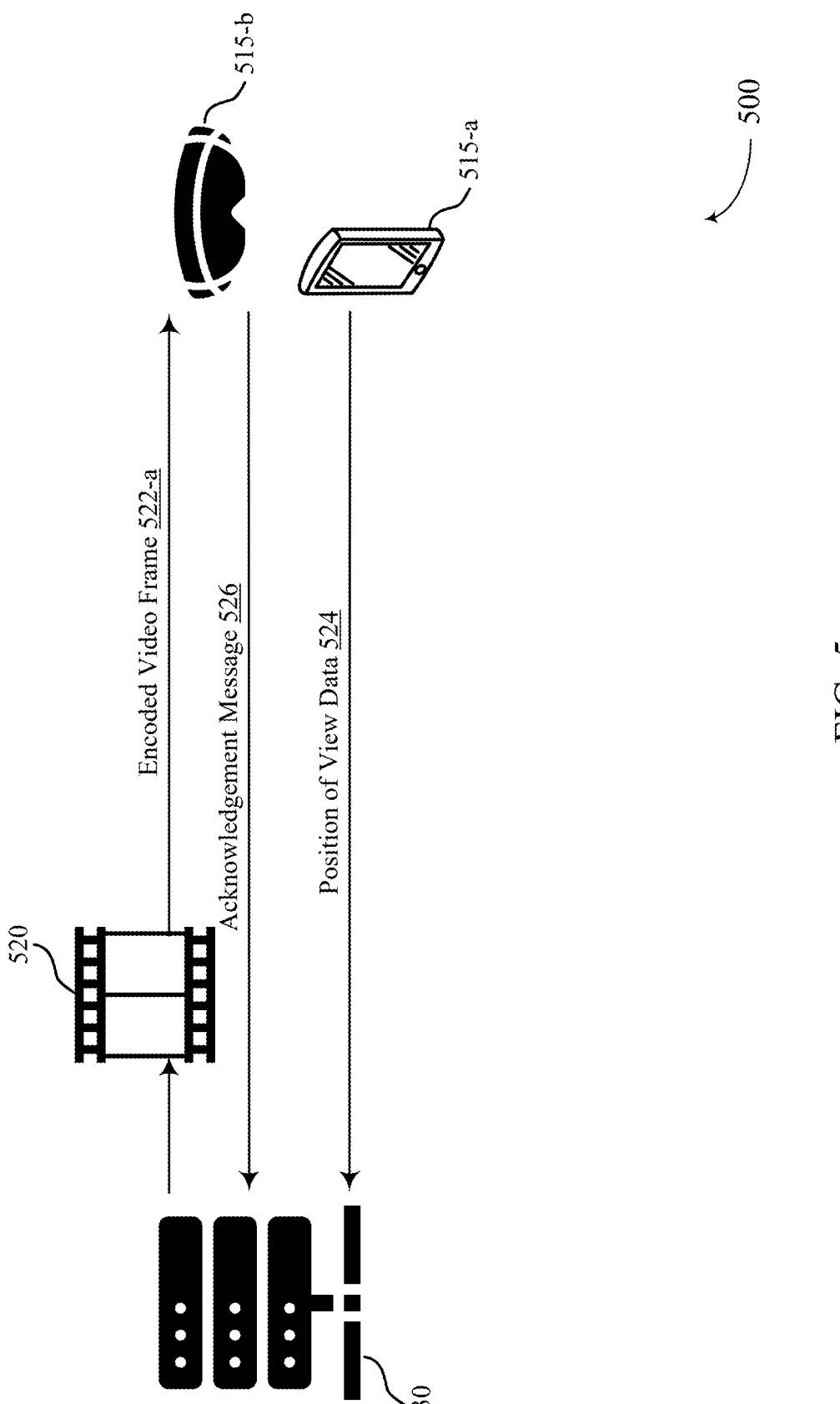
FIG. 5 shows an example of a second video transmission scheme that supports adaptive rate control for video streaming in accordance with one or more aspects of the present disclosure.

FIG. 5 shows an example of a second video transmission scheme 500 in a split XR architecture that supports adaptive rate control for video streaming in accordance with one or more aspects of the present disclosure. The second video transmission scheme 500 may implement or be implemented by aspects of the wireless communications systems 100 and 200 described with reference to FIGS. 1 and 2. For instance, the second video transmission scheme 500 may include a first wireless device 515-a, a second wireless device 515-b, and a server 530. The first wireless device 515-a and the second wireless device 515-b may be examples of the UEs 115 described with reference to FIG. 1 or may be examples of the first wireless device 215-a and the second wireless device 215-b described with reference to FIG. 2. The server 530 may be an example of a server implemented at the core network 130, a network entity 105, or a UE 115, as described with reference to FIG. 1 or may be an example of the server 230 described with reference to FIG. 2.

In this example, the server 530 (e.g., a smartphone, a drone, a media server, etc.) may stream a video bitstream 520 that may be viewed by the second wireless device 515-b (e.g., a HMD). The second wireless device 515-b may be a view-only device and the first wireless device 515-a may be used to capture and control a position of view associated with the second wireless device 515-b and the video bitstream 520 viewed thereon. In such cases, the first wireless device 515-a may send, to the server 530, position of view data 524 (e.g., head pose data, eye gaze data, orientation data, spatial positioning data, etc.) associated with the second wireless device 515-b, the video bitstream 520 being viewed thereon, or a combination thereof, and the server 530 may render a first video frame 522-a of the video bitstream 520 based on the received position of view data 524. The server 530 may encode the rendered first video frame 522-a and may send the encoded first video frame 522-a to the second wireless device 515-b. The second wireless device 515-b may send, to the server 530, an acknowledgement message 526 acknowledging receipt of the encoded first video frame 522-a. The encoded first video frame 522-a may be decoded by second wireless device 515-b, warped with any latest position of view data, and then output at a display of the second wireless device 515-b for viewing by a user.

Figure 6:
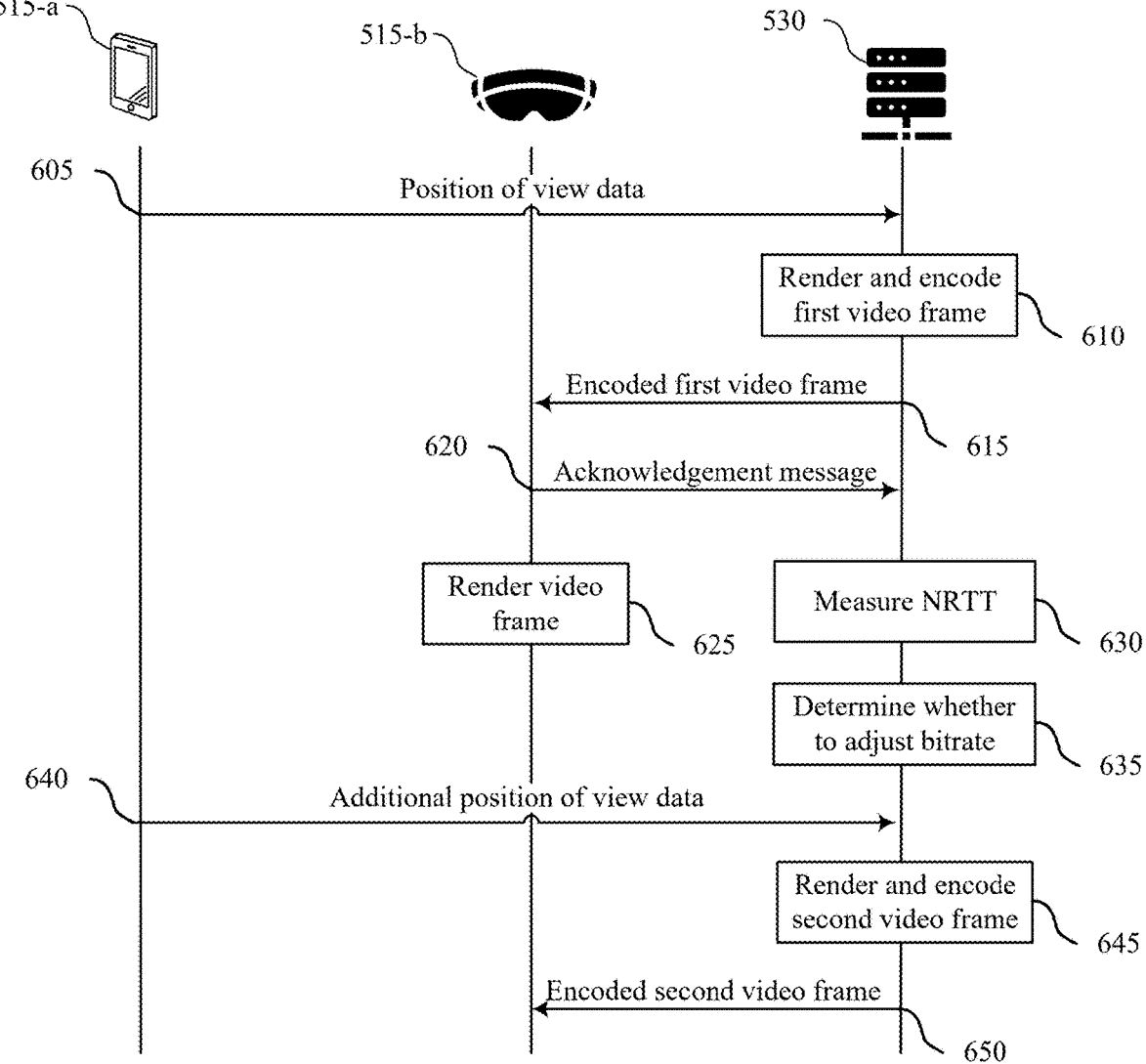
FIG. 6 shows an example of a signal flow that supports the second video transmission scheme for adaptive rate control for video streaming in accordance with one or more aspects of the present disclosure.

FIG. 6 shows an example of a signal flow 600 that supports the second video transmission scheme for adaptive rate control for video streaming in accordance with one or more aspects of the present disclosure. In some examples, signal flow 600 may implement aspects of or may be implemented by aspects of wireless communications systems 100 and 200 and the second video transmission scheme 500, described with reference to FIGS. 1, 2, and 5. For instance, the signal flow 600 may be implemented by the server 530, the first wireless device 515-a, and the second wireless device 515-b, described with reference to FIG. 4. In the following description of the signal flow 600, the communications between the various entities may be performed in different orders or at different times. Some operations may also be omitted from the signal flow 600, and other operations may be added to the signal flow 600. In some examples, the operations illustrated in signal flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At step 605, the first wireless device 515-a may send (e.g., transmit, output, etc.), and the server 530 may receive, position of view data 524. For instance, the first wireless device 515-a may capture or obtain, from the second wireless device 515-b, position of view data 524 (e.g., head pose data, eye gaze data, orientation data, spatial positioning data, etc.) that is associated with the second wireless device 515-b, a video being streamed (e.g., the video bitstream 520) to the second wireless device 515-b, or a combination thereof. The first wireless device 515-a may send the position of view data 524 to the server 530.

At step 610, the server 530 may render and encode a first video frame 522-a, associated with a set of video frames 522 of the video bitstream 520, based on the received position of view data 524. For instance, based on receiving the position of view data 524, the server 530 may obtain the first video frame 522-a (e.g., a next video frame of the set of video frames of the video bitstream 520 to be consumed at the second wireless device 515-b) and may render (e.g., update, synchronize, etc.) the first video frame 522-a based on the received position of view data 524. The server 530 may encode the rendered first video frame 522-a to generate an encoded first video frame 522-a.

At step 615, the server 530 may send (e.g., transmit, output, etc.) the encoded first video frame 522-a to the second wireless device 515-b. The server 530 may mark a time at which the encoded first video frame 522-a is sent to the second wireless device 515-b using a first timestamp.

At step 620, the second wireless device 515-b may send (e.g., transmit, output, etc.), and the server 530 may receive, an acknowledgement message 526 acknowledging receipt of the encoded first video frame 522-a.

At step 625, which may occur before, after, or concurrent with step 620, the second wireless device 515-b may decode and render (e.g., output) the received first video frame 522-a. For instance, the second wireless device 515-b may decode the encoded first video frame 522-a and render the decoded first video frame 522-a by warping the decoded first video frame 522-a with the latest position of view data (e.g., position of view data generated since the encoded first video frame 522-a was transmitted from the server 530). The rendered first video frame 522-a may be output to a display of the second wireless device 515-b.

At step 630, which may occur before, after, or concurrent with steps 620 and 625, the server 530 may measure an NRTT associated with the transmission of the encoded first video frame 522-a. For instance, the server 530 may use a second timestamp to mark a time at which the acknowledgement message is received. Based on the first timestamp (marked at step 615 when the encoded first video frame 522-a is sent from the server 530 to the second wireless device 515-b) and the second timestamp, the server 530 may calculate a CRTT associated with transmission of the encoded first video frame 522-a to the second wireless device 515-b. The server 530 may use the CRTT to measure an NRTT that takes into account delays associated with processing and rendering the position of view data at the server 530. For instance, the server 530 may determine the NRTT after adjusting for the processing delays (e.g., a pose wait time, a rendering time, a render time, an encoding time, or any combination thereof) at the server 530.

The NRTT measured in this example (e.g., the FIG. 6 example) may be equivalent to the NRTT measured in the example of FIG. 4, since the measured NRTT in both examples may capture a time associated with the uplink transmission of a small packet (e.g., the CRTT (that captures a time associated with the transmission of the position of view data) in the example of FIG. 4, and the acknowledgement message 526 in the example of FIG. 6) and transmission of the encoded video packet, and the NRTT is adjusted and calibrated for server processing delays in both examples. In some conventional systems, an uplink transmission of a small packet of position of view data may occur prior to the downlink transmission of the encoded video frame. While in accordance with aspects described herein, the uplink transmission of the small packet occurs after the downlink transmission of the encoded video frame, thereby reducing or minimizing any additional latency associated with the downlink transmission of the encoded video frame.

At step 635, based on the NRTT, the server 530 may determine whether to adjust a bitrate associated with encoding the video bitstream 520 (e.g., whether to increase, reduce, or maintain a current encoding bitrate). For instance, the server 530 may utilize or implement an adaptive rate control algorithm to determine whether to reduce, increase, or maintain the encoding bitrate based on whether the NRTT (or a mean or standard deviation of the NRTT over one or more windows of time) satisfies one or more thresholds.

For example, the server 530 may determine the mean and standard deviation of the NRTT over a window of time. If the mean of the NRTT satisfies (e.g., is greater than) a first threshold or if the standard deviation of the NRTT satisfies (e.g., is greater than) a second threshold, then the server 530 may determine to reduce the bitrate associated with the video bitstream 520.

If the first threshold and second threshold are not satisfied, then the server 530 may determine whether the mean of the NRTT satisfies (e.g., is less than) a third threshold or if the standard deviation of the NRTT satisfies (e.g., is less than) a fourth threshold. If the third threshold or the fourth threshold are satisfied, then the server 530 may determine to increase the bitrate associated with the video bitstream 520.

If the third threshold and the fourth threshold are not satisfied, then the server 530 may determine to maintain the bitrate associated with the video bitstream 520 at the current bitrate.

The server 530 may then adjust or maintain the bitrate of the video bitstream 520 as determined.

At step 640, the first wireless device 515-*a* may send (e.g., transmit, output, etc.), and the server 530 may receive, additional position of view data 524. For instance, the additional position of view data 524 may be based on changes in a head pose, an eye gaze, an orientation, a spatial position, etc. at the second wireless device 515-*b* or associated with the video bitstream 520 streamed at the second wireless device 515-*b*.

At step 645, the server 530 may, thereafter, render and encode a second video frame 522-*b* of the video bitstream 520 based on the additional position of view data 524. In some cases, such as based on the determination of whether to adjust the bitrate of the video bitstream 520, the second video frame 522-*b* may be encoded using an adjusted bitrate. For instance, the bitrate used to encode the second video frame 522-*b* may be different from a bitrate used to encode the first video frame 522-*a*. In other cases, the bitrate used to encode the second video frame 522-*b* may not be adjusted and, instead, may be the same as the bitrate used to encode the first video frame 522-*a*.

At step 650, the server 530 may send (e.g., transmit, output, etc.), to the second wireless device 515-*b*, the encoded second video frame 522-*b*.

Figure 7:
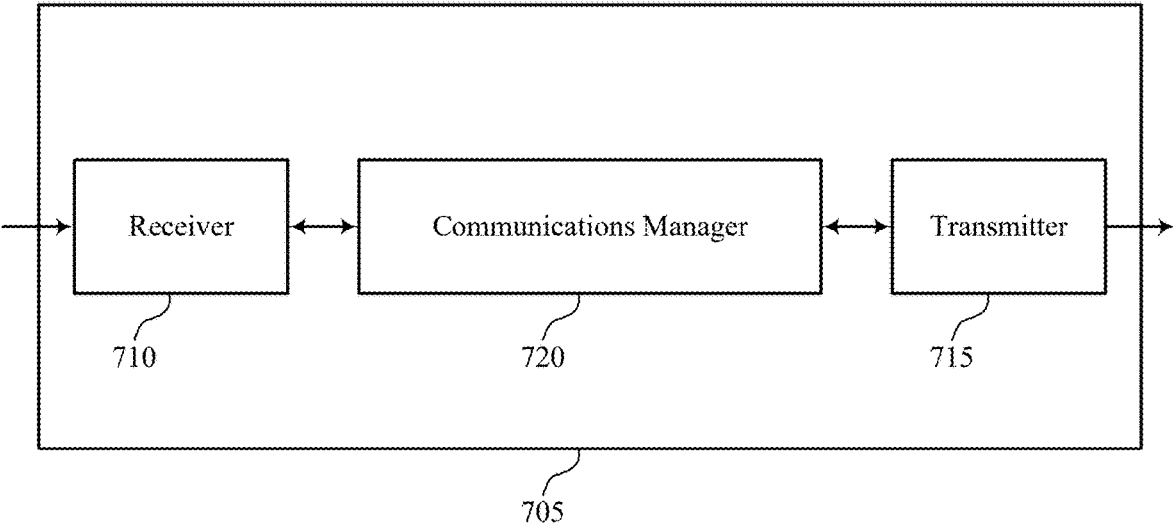
FIGS. 7 and 8 show block diagrams of devices that support adaptive rate control for video streaming in accordance with one or more aspects of the present disclosure.

FIG. 7 shows a block diagram 700 of a device 705 that supports adaptive rate control for video streaming in accordance with one or more aspects of the present disclosure. The device 705 may be an example of aspects of a network entity 105 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations or components thereof may be examples of means for performing various aspects of adaptive rate control for video streaming as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for obtaining, from a first wireless device, position of view data associated with a video bitstream. The communications manager 720 is capable of, configured to, or operable to support a means for outputting, to a second wireless device, a first encoded video frame of a set of video frames associated with the video bitstream, where the first encoded video frame is generated based on the position of view data from the first wireless device, and where output of the first encoded video frame is associated with a first timestamp. The communications manager 720 is capable of, configured to, or operable to support a means for obtaining, from the second wireless device, an acknowledgement message associated with the first encoded video frame, where obtaining of the acknowledgement message is associated with a second timestamp. The communications manager 720 is capable of, configured to, or operable to support a means for outputting, to the second wireless device, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced latency, reduced processing, and more efficient utilization of communication resources.

Figure 8:
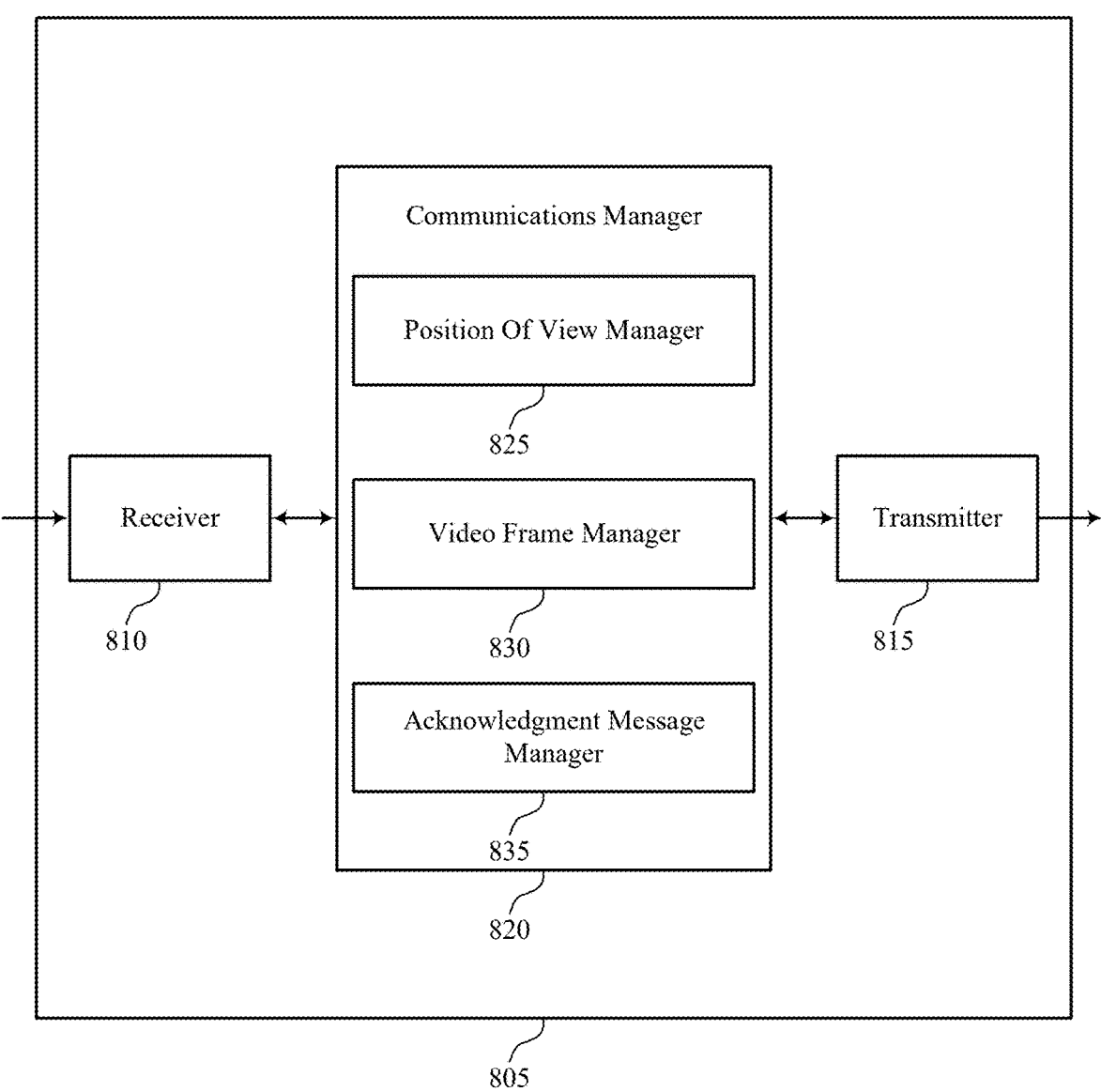

FIG. 8 shows a block diagram 800 of a device 805 that supports adaptive rate control for video streaming in accordance with one or more aspects of the present disclosure. The device 805 may be an example of aspects of a device 705 or a network entity 105 as described herein. The device 805 may include a receiver 810, a transmitter 815, and a communications manager 820. The device 805, or one of more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of adaptive rate control for video streaming as described herein. For example, the communications manager 820 may include a position of view manager 825, a video frame manager 830, an acknowledgment message manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The position of view manager 825 is capable of, configured to, or operable to support a means for obtaining, from a first wireless device, position of view data associated with a video bitstream. The video frame manager 830 is capable of, configured to, or operable to support a means for outputting, to a second wireless device, a first encoded video frame of a set of video frames associated with the video bitstream, where the first encoded video frame is generated based on the position of view data from the first wireless device, and where output of the first encoded video frame is associated with a first timestamp. The acknowledgment message manager 835 is capable of, configured to, or operable to support a means for obtaining, from the second wireless device, an acknowledgement message associated with the first encoded video frame, where obtaining of the acknowledgement message is associated with a second timestamp. The video frame manager 830 is capable of, configured to, or operable to support a means for outputting, to the second wireless device, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp.

Figure 9:
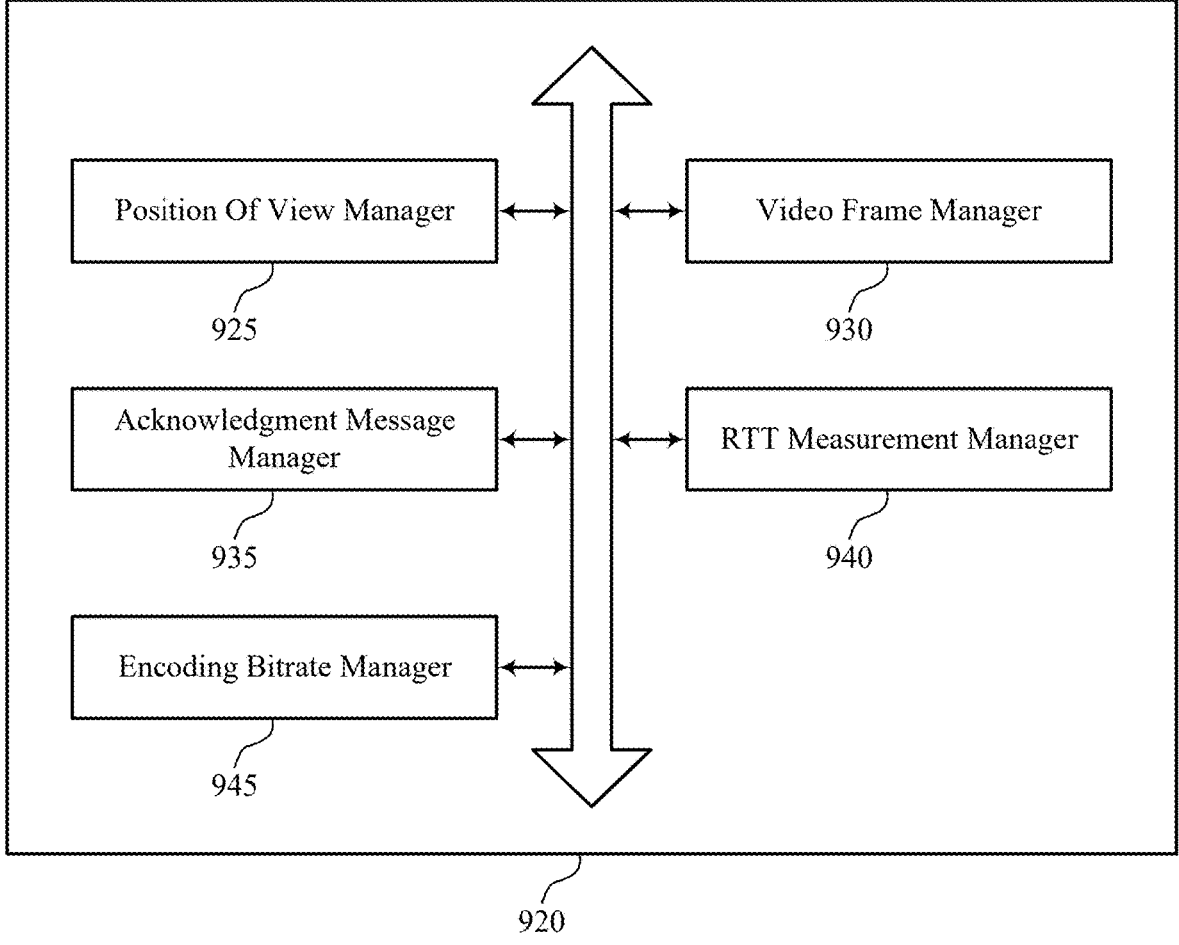
FIG. 9 shows a block diagram of a communications manager that supports adaptive rate control for video streaming in accordance with one or more aspects of the present disclosure.

FIG. 9 shows a block diagram 900 of a communications manager 920 that supports adaptive rate control for video streaming in accordance with one or more aspects of the present disclosure. The communications manager 920 may be an example of aspects of a communications manager 720, a communications manager 820, or both, as described herein. The communications manager 920, or various components thereof, may be an example of means for performing various aspects of adaptive rate control for video streaming as described herein. For example, the communications manager 920 may include a position of view manager 925, a video frame manager 930, an acknowledgment message manager 935, an RTT measurement manager 940, an encoding bitrate manager 945, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications in accordance with examples as disclosed herein. The position of view manager 925 is capable of, configured to, or operable to support a means for obtaining, from a first wireless device, position of view data associated with a video bitstream. The video frame manager 930 is capable of, configured to, or operable to support a means for outputting, to a second wireless device, a first encoded video frame of a set of video frames associated with the video bitstream, where the first encoded video frame is generated based on the position of view data from the first wireless device, and where output of the first encoded video frame is associated with a first timestamp. The acknowledgment message manager 935 is capable of, configured to, or operable to support a means for obtaining, from the second wireless device, an acknowledgement message associated with the first encoded video frame, where obtaining of the acknowledgement message is associated with a second timestamp. In some examples, the video frame manager 930 is capable of, configured to, or operable to support a means for outputting, to the second wireless device, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp.

In some examples, the RTT measurement manager 940 is capable of, configured to, or operable to support a means for measuring, based on the client RTT and a network processing time associated with processing the first encoded video frame, a NRTT.

In some examples, the network processing time includes a sum of a pose wait time, a rendering time, and an encoding time.

In some examples, the encoding bitrate manager 945 is capable of, configured to, or operable to support a means for adjusting, based on the NRTT, an encoding bitrate associated with encoding the video bitstream from the first bitrate to the second bitrate.

In some examples, the first wireless device is a controller device configured to generate the position of view data. In some examples, the second wireless device is a HMD configured to output the video bitstream.

In some examples, the controller device is a joystick, a mobile phone, or a first person view (FPV) drone.

In some examples, the position of view data includes head pose data, eye gaze data, or a combination thereof.

FIG. 10 shows a diagram of a system 1000 including a device 1005 that supports adaptive rate control for video streaming in accordance with one or more aspects of the present disclosure. The device 1005 may be an example of or include components of a device 705, a device 805, or a network entity 105 as described herein. The device 1005 may communicate with other network devices or network equipment such as one or more of the network entities 105, UEs 115, or any combination thereof. The communications may include communications over one or more wired interfaces, over one or more wireless interfaces, or any combination thereof. The device 1005 may include components that support outputting and obtaining communications, such as a communications manager 1020, a transceiver 1010, one or more antennas 1015, at least one memory 1025, code 1030, and at least one processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (e.g., the at least one processor 1035, the at least one memory 1025, or both), may be included in a chip or chip assembly that is installed in the device 1005. In some examples, the transceiver 1010 may be operable to support communications via one or more communications links (e.g., communication link(s) 125, backhaul communication link(s) 120, a midhaul communication link 162, a fronthaul communication link 168).

The at least one memory 1025 may include RAM, ROM, or any combination thereof. The at least one memory 1025 may store computer-readable, computer-executable, or processor-executable code, such as the code 1030. The code 1030 may include instructions that, when executed by one or more of the at least one processor 1035, cause the device 1005 to perform various functions described herein. The code 1030 may be stored in a non-transitory computer-readable medium such as system memory or another type of memory. In some cases, the code 1030 may not be directly executable by a processor of the at least one processor 1035 but may cause a computer (e.g., when compiled and executed) to perform functions described herein. In some cases, the at least one memory 1025 may include, among other things, a BIOS which may control basic hardware or software operation such as the interaction with peripheral components or devices. In some examples, the at least one processor 1035 may include multiple processors and the at least one memory 1025 may include multiple memories. One or more of the multiple processors may be coupled with one or more of the multiple memories which may, individually or collectively, be configured to perform various functions herein (for example, as part of a processing system).

The at least one processor 1035 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1035 may be configured to operate a memory array using a memory controller. In some other cases, a memory controller may be integrated into one or more of the at least one processor 1035. The at least one processor 1035 may be configured to execute computer-readable instructions stored in a memory (e.g., one or more of the at least one memory 1025) to cause the device 1005 to perform various functions (e.g., functions or tasks supporting adaptive rate control for video streaming). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (e.g., one or more physical nodes and supporting software such as operating systems, virtual machines, or container instances) that may host the functions (e.g., by executing code 1030) to perform the functions of the device 1005. The at least one processor 1035 may be any one or more suitable processors capable of executing scripts or instructions of one or more software programs stored in the device 1005 (such as within one or more of the at least one memory 1025).

In some examples, the at least one processor 1035 may include multiple processors and the at least one memory 1025 may include multiple memories. One or more of the multiple processors may be coupled with one or more of the multiple memories, which may, individually or collectively, be configured to perform various functions herein. In some examples, the at least one processor 1035 may be a component of a processing system, which may refer to a system (such as a series) of machines, circuitry (including, for example, one or both of processor circuitry (which may include the at least one processor 1035) and memory circuitry (which may include the at least one memory 1025)), or components, that receives or obtains inputs and processes the inputs to produce, generate, or obtain a set of outputs. The processing system may be configured to perform one or more of the functions described herein. For example, the at least one processor 1035 or a processing system including the at least one processor 1035 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1025 or otherwise, to perform one or more of the functions described herein.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with one or more other network entities 105, and may include a controller or scheduler for controlling communications with UEs 115 (e.g., in cooperation with the one or more other network devices). In some examples, the communications manager 1020 may support an X2 interface within an LTE/LTE-A wireless communications network technology to provide communication between network entities 105.

The communications manager 1020 may support wireless communications in accordance with examples as disclosed herein. For example, the communications manager 1020 is capable of, configured to, or operable to support a means for obtaining, from a first wireless device, position of view data associated with a video bitstream. The communications manager 1020 is capable of, configured to, or operable to support a means for outputting, to a second wireless device, a first encoded video frame of a set of video frames associated with the video bitstream, where the first encoded video frame is generated based on the position of view data from the first wireless device, and where output of the first encoded video frame is associated with a first timestamp. The communications manager 1020 is capable of, configured to, or operable to support a means for obtaining, from the second wireless device, an acknowledgement message associated with the first encoded video frame, where obtaining of the acknowledgement message is associated with a second timestamp. The communications manager 1020 is capable of, configured to, or operable to support a means for outputting, to the second wireless device, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp.

By including or configuring the communications manager 1020 in accordance with examples as described herein, the device 1005 may support techniques for reduced latency, improved user experience related to reduced processing, more efficient utilization of communication resources, and improved coordination between devices.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, one or more of the at least one processor 1035, one or more of the at least one memory 1025, the code 1030, or any combination thereof (for example, by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of adaptive rate control for video streaming as described herein, or the at least one processor 1035 and the at least one memory 1025 may be otherwise configured to, individually or collectively, perform or support such operations.

FIG. 11 shows a block diagram 1100 of a device 1105 that supports adaptive rate control for video streaming in accordance with one or more aspects of the present disclosure. The device 1105 may be an example of aspects of a UE 115 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to adaptive rate control for video streaming). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to adaptive rate control for video streaming). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations or components thereof may be examples of means for performing various aspects of adaptive rate control for video streaming as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry).

The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for obtaining, from a second wireless device, position of view data associated with a video bitstream. The communications manager 1120 is capable of, configured to, or operable to support a means for sending, to a network entity, the position of view data.

Additionally, or alternatively, the communications manager 1120 may support wireless communications in accordance with examples as disclosed herein. For example, the communications manager 1120 is capable of, configured to, or operable to support a means for receiving, from a network entity, a first encoded video frame of a set of video frames associated with a video bitstream, where the first encoded video frame based on position of view data from a first wireless device, and where receipt of the first encoded video frame is associated with a first timestamp. The communications manager 1120 is capable of, configured to, or operable to support a means for decoding the first encoded video frame. The communications manager 1120 is capable of, configured to, or operable to support a means for outputting, via a display device, the decoded first encoded video frame. The communications manager 1120 is capable of, configured to, or operable to support a means for sending, to the network entity, an acknowledgement message associated with the first encoded video frame, where obtaining of the acknowledgement message is associated with a second timestamp. The communications manager 1120 is capable of, configured to, or operable to support a means for receiving, from the network entity, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp. The communications manager 1120 is capable of, configured to, or operable to support a means for decoding the second encoded video frame. The communications manager 1120 is capable of, configured to, or operable to support a means for outputting, via the display device, the decoded second encoded video frame.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reduced latency and more efficient utilization of communication resources FIG. 12 shows a block diagram 1200 of a device 1205 that supports adaptive rate control for video streaming in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205, or one of more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to adaptive rate control for video streaming). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to adaptive rate control for video streaming). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of adaptive rate control for video streaming as described herein. For example, the communications manager 1220 may include a position of view manager 1225, a video frame manager 1230, an acknowledgement message manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The position of view manager 1225 is capable of, configured to, or operable to support a means for obtaining, from a second wireless device, position of view data associated with a video bitstream. The position of view manager 1225 is capable of, configured to, or operable to support a means for sending, to a network entity, the position of view data.

Additionally, or alternatively, the communications manager 1220 may support wireless communications in accordance with examples as disclosed herein. The video frame manager 1230 is capable of, configured to, or operable to support a means for receiving, from a network entity, a first encoded video frame of a set of video frames associated with a video bitstream, where the first encoded video frame based on position of view data from a first wireless device, and where receipt of the first encoded video frame is associated with a first timestamp. The video frame manager 1230 is capable of, configured to, or operable to support a means for decoding the first encoded video frame. The video frame manager 1230 is capable of, configured to, or operable to support a means for outputting, via a display device, the decoded first encoded video frame. The acknowledgement message manager 1235 is capable of, configured to, or operable to support a means for sending, to the network entity, an acknowledgement message associated with the first encoded video frame, where obtaining of the acknowledgement message is associated with a second timestamp. The video frame manager 1230 is capable of, configured to, or operable to support a means for receiving, from the network entity, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp. The video frame manager 1230 is capable of, configured to, or operable to support a means for decoding the second encoded video frame. The video frame manager 1230 is capable of, configured to, or operable to support a means for outputting, via the display device, the decoded second encoded video frame.

FIG. 13 shows a block diagram 1300 of a communications manager 1320 that supports adaptive rate control for video streaming in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of adaptive rate control for video streaming as described herein. For example, the communications manager 1320 may include a position of view manager 1325, a video frame manager 1330, an acknowledgement message manager 1335, or any combination thereof. Each of these components, or components or subcomponents thereof (e.g., one or more processors, one or more memories), may communicate, directly or indirectly, with one another (e.g., via one or more buses).

The communications manager 1320 may support wireless communications in accordance with examples as disclosed herein. The position of view manager 1325 is capable of, configured to, or operable to support a means for obtaining, from a second wireless device, position of view data associated with a video bitstream. In some examples, the position of view manager 1325 is capable of, configured to, or operable to support a means for sending, to a network entity, the position of view data.

Additionally, or alternatively, the communications manager 1320 may support wireless communications in accordance with examples as disclosed herein. The video frame manager 1330 is capable of, configured to, or operable to support a means for receiving, from a network entity, a first encoded video frame of a set of video frames associated with a video bitstream, where the first encoded video frame based on position of view data from a first wireless device, and where receipt of the first encoded video frame is associated with a first timestamp. In some examples, the video frame manager 1330 is capable of, configured to, or operable to support a means for decoding the first encoded video frame. In some examples, the video frame manager 1330 is capable of, configured to, or operable to support a means for outputting, via a display device, the decoded first encoded video frame. The acknowledgement message manager 1335 is capable of, configured to, or operable to support a means for sending, to the network entity, an acknowledgement message associated with the first encoded video frame, where obtaining of the acknowledgement message is associated with a second timestamp. In some examples, the video frame manager 1330 is capable of, configured to, or operable to support a means for receiving, from the network entity, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp. In some examples, the video frame manager 1330 is capable of, configured to, or operable to support a means for decoding the second encoded video frame. In some examples, the video frame manager 1330 is capable of, configured to, or operable to support a means for outputting, via the display device, the decoded second encoded video frame.

FIG. 14 shows a diagram of a system 1400 including a device 1405 that supports adaptive rate control for video streaming in accordance with one or more aspects of the present disclosure. The device 1405 may be an example of or include components of a device 1105, a device 1205, or a UE 115 as described herein. The device 1405 may communicate (e.g., wirelessly) with one or more other devices (e.g., network entities 105, UEs 115, or a combination thereof). The device 1405 may include components for bi-directional voice and data communications including components for transmitting and receiving communications, such as a communications manager 1420, an input/output (I/O) controller, such as an I/O controller 1410, a transceiver 1415, one or more antennas 1425, at least one memory 1430, code 1435, and at least one processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of one or more processors, such as the at least one processor 1440. In some cases, a user may interact with the device 1405 via the I/O controller 1410 or via hardware components controlled by the I/O controller 1410.

In some cases, the device 1405 may include a single antenna. However, in some other cases, the device 1405 may have more than one antenna, which may be capable of concurrently transmitting or receiving multiple wireless transmissions. The transceiver 1415 may communicate bi-directionally via the one or more antennas 1425 using wired or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The at least one memory 1430 may include random access memory (RAM) and read-only memory (ROM). The at least one memory 1430 may store computer-readable, computer-executable, or processor-executable code, such as the code 1435. The code 1435 may include instructions that, when executed by the at least one processor 1440, cause the device 1405 to perform various functions described herein. The code 1435 may be stored in a non-transitory computer-readable medium such as system memory or another type of memory. In some cases, the code 1435 may not be directly executable by the at least one processor 1440 but may cause a computer (e.g., when compiled and executed) to perform functions described herein. In some cases, the at least one memory 1430 may include, among other things, a basic I/O system (BIOS) which may control basic hardware or software operation such as the interaction with peripheral components or devices.

The at least one processor 1440 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1440 may be configured to operate a memory array using a memory controller. In some other cases, a memory controller may be integrated into the at least one processor 1440. The at least one processor 1440 may be configured to execute computer-readable instructions stored in a memory (e.g., the at least one memory 1430) to cause the device 1405 to perform various functions (e.g., functions or tasks supporting adaptive rate control for video streaming). For example, the device 1405 or a component of the device 1405 may include at least one processor

1440 and at least one memory 1430 coupled with or to the at least one processor 1440, the at least one processor 1440 and the at least one memory 1430 configured to perform various functions described herein.

In some examples, the at least one processor 1440 may include multiple processors and the at least one memory 1430 may include multiple memories. One or more of the multiple processors may be coupled with one or more of the multiple memories, which may, individually or collectively, be configured to perform various functions described herein. In some examples, the at least one processor 1440 may be a component of a processing system, which may refer to a system (such as a series) of machines, circuitry (including, for example, one or both of processor circuitry (which may include the at least one processor 1440) and memory circuitry (which may include the at least one memory 1430)), or components, that receives or obtains inputs and processes the inputs to produce, generate, or obtain a set of outputs. The processing system may be configured to perform one or more of the functions described herein. For example, the at least one processor 1440 or a processing system including the at least one processor 1440 may be configured to, configurable to, or operable to cause the device 1405 to perform one or more of the functions described herein. Further, as described herein, being "configured to," being "configurable to," and being "operable to" may be used interchangeably and may be associated with a capability, when executing code 1435 (e.g., processor-executable code) stored in the at least one memory 1430 or otherwise, to perform one or more of the functions described herein.

The communications manager 1420 may support wireless communications in accordance with examples as disclosed herein. For example, the communications manager 1420 is capable of, configured to, or operable to support a means for obtaining, from a second wireless device, position of view data associated with a video bitstream. The communications manager 1420 is capable of, configured to, or operable to support a means for sending, to a network entity, the position of view data.

Additionally, or alternatively, the communications manager 1420 may support wireless communications in accordance with examples as disclosed herein. For example, the communications manager 1420 is capable of, configured to, or operable to support a means for receiving, from a network entity, a first encoded video frame of a set of video frames associated with a video bitstream, where the first encoded video frame based on position of view data from a first wireless device, and where receipt of the first encoded video frame is associated with a first timestamp. The communications manager 1420 is capable of, configured to, or operable to support a means for decoding the first encoded video frame. The communications manager 1420 is capable of, configured to, or operable to support a means for outputting, via a display device, the decoded first encoded video frame. The communications manager 1420 is capable of, configured to, or operable to support a means for sending, to the network entity, an acknowledgement message associated with the first encoded video frame, where obtaining of the acknowledgement message is associated with a second timestamp. The communications manager 1420 is capable of, configured to, or operable to support a means for receiving, from the network entity, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp.

The communications manager 1420 is capable of, configured to, or operable to support a means for decoding the second encoded video frame. The communications manager 1420 is capable of, configured to, or operable to support a means for outputting, via the display device, the decoded second encoded video frame.

By including or configuring the communications manager 1420 in accordance with examples as described herein, the device 1405 may support techniques for reduced latency, more efficient utilization of communication resources, improved coordination between devices, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the at least one processor 1440, the at least one memory 1430, the code 1435, or any combination thereof. For example, the code 1435 may include instructions executable by the at least one processor 1440 to cause the device 1405 to perform various aspects of adaptive rate control for video streaming as described herein, or the at least one processor 1440 and the at least one memory 1430 may be otherwise configured to, individually or collectively, perform or support such operations.

FIG. 15 shows a flowchart illustrating a method 1500 that supports adaptive rate control for video streaming in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include obtaining, from a first wireless device, position of view data associated with a video bitstream. The operations of 1505 may be performed in accordance with examples as disclosed herein. In some examples, aspects of the operations of 1505 may be performed by a position of view manager 925 as described with reference to FIG. 9.

At 1510, the method may include outputting, to a second wireless device, a first encoded video frame of a set of video frames associated with the video bitstream, where the first encoded video frame is generated based on the position of view data from the first wireless device, and where output of the first encoded video frame is associated with a first timestamp. The operations of 1510 may be performed in accordance with examples as disclosed herein. In some examples, aspects of the operations of 1510 may be performed by a video frame manager 930 as described with reference to FIG. 9.

At 1515, the method may include obtaining, from the second wireless device, an acknowledgement message associated with the first encoded video frame, where obtaining of the acknowledgement message is associated with a second timestamp. The operations of 1515 may be performed in accordance with examples as disclosed herein. In some examples, aspects of the operations of 1515 may be performed by an acknowledgment message manager 935 as described with reference to FIG. 9.

At 1520, the method may include outputting, to the second wireless device, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp. The operations of 1520 may be performed in accordance with examples as disclosed herein. In some examples, aspects of the operations of 1520 may be performed by a video frame manager 930 as described with reference to FIG. 9.

FIG. 16 shows a flowchart illustrating a method 1600 that supports adaptive rate control for video streaming in accordance with one or more aspects of the present disclosure. The operations of the method 1600 may be implemented by a UE or its components as described herein. For example, the operations of the method 1600 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1605, the method may include obtaining, from a second wireless device, position of view data associated with a video bitstream. The operations of 1605 may be performed in accordance with examples as disclosed herein. In some examples, aspects of the operations of 1605 may be performed by a position of view manager 1325 as described with reference to FIG. 13.

At 1610, the method may include sending, to a network entity, the position of view data. The operations of 1610 may be performed in accordance with examples as disclosed herein. In some examples, aspects of the operations of 1610 may be performed by a position of view manager 1325 as described with reference to FIG. 13.

FIG. 17 shows a flowchart illustrating a method 1700 that supports adaptive rate control for video streaming in accordance with one or more aspects of the present disclosure. The operations of the method 1700 may be implemented by a UE or its components as described herein. For example, the operations of the method 1700 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, a first encoded video frame of a set of video frames associated with a video bitstream, where the first encoded video frame based on position of view data from a first wireless device, and where receipt of the first encoded video frame is associated with a first timestamp. The operations of 1705 may be performed in accordance with examples as disclosed herein. In some examples, aspects of the operations of 1705 may be performed by a video frame manager 1330 as described with reference to FIG. 13.

At 1710, the method may include decoding the first encoded video frame. The operations of 1710 may be performed in accordance with examples as disclosed herein. In some examples, aspects of the operations of 1710 may be performed by a video frame manager 1330 as described with reference to FIG. 13.

At 1715, the method may include outputting, via a display device, the decoded first encoded video frame. The operations of 1715 may be performed in accordance with examples as disclosed herein. In some examples, aspects of the operations of 1715 may be performed by a video frame manager 1330 as described with reference to FIG. 13.

At 1720, the method may include sending, to the network entity, an acknowledgement message associated with the first encoded video frame, where obtaining of the acknowledgement message is associated with a second timestamp. The operations of 1720 may be performed in accordance with examples as disclosed herein. In some examples, aspects of the operations of 1720 may be performed by an acknowledgement message manager 1335 as described with reference to FIG. 13.

At 1725, the method may include receiving, from the network entity, a second encoded video frame of the set of video frames, where the second encoded video frame is encoded using a second bitrate that is different from a first bitrate used to encode the first encoded video frame, and where the second bitrate is based on a CRTT corresponding to the first timestamp and the second timestamp. The operations of 1725 may be performed in accordance with examples as disclosed herein. In some examples, aspects of the operations of 1725 may be performed by a video frame manager 1330 as described with reference to FIG. 13.

At 1730, the method may include decoding the second encoded video frame. The operations of 1730 may be performed in accordance with examples as disclosed herein. In some examples, aspects of the operations of 1730 may be performed by a video frame manager 1330 as described with reference to FIG. 13.

At 1735, the method may include outputting, via the display device, the decoded second encoded video frame. The operations of 1735 may be performed in accordance with examples as disclosed herein. In some examples, aspects of the operations of 1735 may be performed by a video frame manager 1330 as described with reference to FIG. 13.

The following provides an overview of aspects of the present disclosure:

Aspect 1: A method for wireless communications by a network entity, comprising: obtaining, from a first wireless device, position of view data associated with a video bitstream; outputting, to a second wireless device, a first encoded video frame of a set of video frames associated with the video bitstream, wherein the first encoded video frame is generated based at least in part on the position of view data from the first wireless device, and wherein output of the first encoded video frame is associated with a first timestamp; obtaining, from the second wireless device, an acknowledgement message associated with the first encoded video frame, wherein obtaining of the acknowledgement message is associated with a second timestamp; and outputting, to the second wireless device, a second encoded video frame of the set of video frames, wherein the second encoded video frame is encoded using a second bitrate that is different from a first bitrate used to encode the first encoded video frame, and wherein the second bitrate is based at least in part on a client RTT corresponding to the first timestamp and the second timestamp.

Aspect 2: The method of aspect 1, further comprising: measuring, based at least in part on the client RTT and a network processing time associated with processing the first encoded video frame, a NRTT.

Aspect 3: The method of aspect 2, wherein the network processing time comprises a sum of a pose wait time, a rendering time, and an encoding time.

Aspect 4: The method of any of aspects 2 through 3, further comprising: adjusting, based at least in part on the NRTT, an encoding bitrate associated with encoding the video bitstream from the first bitrate to the second bitrate.

Aspect 5: The method of any of aspects 1 through 4, wherein the first wireless device is a controller device configured to generate the position of view data, and the second wireless device is a HMD configured to output the video bitstream.

Aspect 6: The method of aspect 5, wherein the controller device is a joystick, a mobile phone, or a FPV drone.

Aspect 7: The method of any of aspects 1 through 6, wherein the position of view data comprises head pose data, eye gaze data, or a combination thereof.

Aspect 8: A method for wireless communications by a first wireless device, comprising: obtaining, from a second wireless device, position of view data associated with a video bitstream; and sending, to a network entity, the position of view data.

Aspect 9: A method for wireless communications by a second wireless device, comprising: receiving, from a network entity, a first encoded video frame of a set of video frames associated with a video bitstream, wherein the first encoded video frame based at least in part on position of view data from a first wireless device, and wherein receipt of the first encoded video frame is associated with a first timestamp; decoding the first encoded video frame; outputting, via a display device, the decoded first encoded video frame; sending, to the network entity, an acknowledgement message associated with the first encoded video frame, wherein obtaining of the acknowledgement message is associated with a second timestamp; receiving, from the network entity, a second encoded video frame of the set of video frames, wherein the second encoded video frame is encoded using a second bitrate that is different from a first bitrate used to encode the first encoded video frame, and wherein the second bitrate is based at least in part on a client RTT corresponding to the first timestamp and the second timestamp; decoding the second encoded video frame; and outputting, via the display device, the decoded second encoded video frame.

Aspect 10: A network entity for wireless communications, comprising one or more memories storing processor-executable code, and one or more processors coupled with the one or more memories and individually or collectively operable to execute the code to cause the network entity to perform a method of any of aspects 1 through 7.

Aspect 11: A network entity for wireless communications, comprising at least one means for performing a method of any of aspects 1 through 7.

Aspect 12: A non-transitory computer-readable medium storing code for wireless communications, the code comprising instructions executable by one or more processors to perform a method of any of aspects 1 through 7.

Aspect 13: A first wireless device for wireless communications, comprising one or more memories storing processor-executable code, and one or more processors coupled with the one or more memories and individually or collectively operable to execute the code to cause the first wireless device to perform a method of any of aspects 8 through 8.

Aspect 14: A first wireless device for wireless communications, comprising at least one means for performing a method of any of aspects 8 through 8.

Aspect 15: A non-transitory computer-readable medium storing code for wireless communications, the code comprising instructions executable by one or more processors to perform a method of any of aspects 8 through 8.

Aspect 16: A second wireless device for wireless communications, comprising one or more memories storing processor-executable code, and one or more processors coupled with the one or more memories and individually or collectively operable to execute the code to cause the second wireless device to perform a method of any of aspects 9 through 9.

Aspect 17: A second wireless device for wireless communications, comprising at least one means for performing a method of any of aspects 9 through 9.

Aspect 18: A non-transitory computer-readable medium storing code for wireless communications, the code comprising instructions executable by one or more processors to perform a method of any of aspects 9 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:
   one or more memories storing processor-executable code; and
   one or more processors coupled with the one or more memories and individually or collectively operable to execute the code to cause the network entity to:
      obtain, from a first wireless device, position of view data associated with a video bitstream;

output, to a second wireless device, a first encoded video frame of a set of video frames associated with the video bitstream, wherein the first encoded video frame is generated based at least in part on the position of view data from the first wireless device, and wherein output of the first encoded video frame is associated with a first timestamp;

obtain, from the second wireless device, an acknowledgement message associated with the first encoded video frame, wherein obtaining of the acknowledgement message is associated with a second timestamp; and output, to the second wireless device, a second encoded video frame of the set of video frames, wherein the second encoded video frame is encoded using a second bitrate that is different from a first bitrate used to encode the first encoded video frame, and wherein the second bitrate is based at least in part on a client round trip time (CRTT) corresponding to the first timestamp and the second timestamp.

2. The network entity of claim 1, wherein the one or more processors are individually or collectively further operable to execute the code to cause the network entity to:

measure, based at least in part on the CRTT and a network processing time associated with processing the first encoded video frame, a network RTT (NRTT).

3. The network entity of claim 2, wherein the network processing time comprises a sum of a pose wait time, a rendering time, and an encoding time.

4. The network entity of claim 2, wherein the one or more processors are individually or collectively further operable to execute the code to cause the network entity to:

adjusting, base at least in part on the NRTT, an encoding bitrate associated with encoding the video bitstream from the first bitrate to the second bitrate.

5. The network entity of claim 1, wherein:

the first wireless device is a controller device configured to generate the position of view data, and the second wireless device is a head-mounted display (HMD) configured to output the video bitstream.

6. The network entity of claim 5, wherein the controller device is a joystick, a mobile phone, or a first person view (FPV) drone.

7. The network entity of claim 1, wherein the position of view data comprises head pose data, eye gaze data, or a combination thereof.

8. A method for wireless communications by a network entity, comprising:

obtaining, from a first wireless device, position of view data associated with a video bitstream;

outputting, to a second wireless device, a first encoded video frame of a set of video frames associated with the video bitstream, wherein the first encoded video frame is generated based at least in part on the position of view data from the first wireless device, and wherein output of the first encoded video frame is associated with a first timestamp;

obtaining, from the second wireless device, an acknowledgement message associated with the first encoded video frame, wherein obtaining of the acknowledgement message is associated with a second timestamp; and outputting, to the second wireless device, a second encoded video frame of the set of video frames, wherein the second encoded video frame is encoded using a second bitrate that is different from a first bitrate used to encode the first encoded video frame, and wherein the second bitrate is based at least in part on a client round trip time (CRTT) corresponding to the first timestamp and the second timestamp.

9. The method of claim 8, further comprising:

measuring, based at least in part on the CRTT a network processing time associated with processing the first encoded video frame, a network RTT (NRTT).

10. The method of claim 9, wherein the network processing time comprises a sum of a pose wait time, a rendering time, and an encoding time.

11. The method of claim 9, further comprising:

adjusting, based at least in part on the NRTT, an encoding bitrate associated with encoding the video bitstream from the first bitrate to the second bitrate.

12. The method of claim 8, wherein:

the first wireless device is a controller device configured to generate the position of view data, and the second wireless device is a head-mounted display (HMD) configured to output the video bitstream.

13. The method of claim 12, wherein the controller device is a joystick, a mobile phone, or a first person view (FPV) drone.

14. The method of claim 8, wherein the position of view data comprises head pose data, eye gaze data, or a combination thereof.

15. A non-transitory computer-readable medium storing code for wireless communications, the code comprising instructions executable by one or more processors to:

obtain, from a first wireless device, position of view data associated with a video bitstream;

output, to a second wireless device, a first encoded video frame of a set of video frames associated with the video bitstream, wherein the first encoded video frame is generated based at least in part on the position of view data from the first wireless device, and wherein output of the first encoded video frame is associated with a first timestamp;

obtain, from the second wireless device, an acknowledgement message associated with the first encoded video frame, wherein obtaining of the acknowledgement message is associated with a second timestamp; and output, to the second wireless device, a second encoded video frame of the set of video frames, wherein the second encoded video frame is encoded using a second bitrate that is different from a first bitrate used to encode the first encoded video frame, and wherein the second bitrate is based at least in part on a client round trip time (CRTT) corresponding to the first timestamp and the second timestamp.

16. The non-transitory computer-readable medium of claim 15, wherein the instructions are further executable by the one or more processors to:

measure, based at least in part on the CRTT and a network processing time associated with processing the first encoded video frame, a network RTT (NRTT).

17. The non-transitory computer-readable medium of claim 16, wherein the network processing time comprises a sum of a pose wait time, a rendering time, and an encoding time.

18. The non-transitory computer-readable medium of claim 16, wherein the instructions are further executable by the one or more processors to:

adjusting, base at least in part on the NRTT, an encoding bitrate associated with encoding the video bitstream from the first bitrate to the second bitrate.

19. The non-transitory computer-readable medium of claim 15, wherein:

the first wireless device is a controller device configured
    to generate the position of view data, the controller device is a joystick, a mobile phone, or a
    first person view (FPV) drone, and the second wireless device is a head-mounted display
    (HMD) configured to output the video bitstream.

20. The non-transitory computer-readable medium of
claim 15, wherein the position of view data comprises head
pose data, eye gaze data, or a combination thereof.

*   *   *   *   *